(12) United States Patent
Kobielski et al.

(10) Patent No.: US 11,761,379 B2
(45) Date of Patent: Sep. 19, 2023

(54) SYSTEM FOR A COMBINED TURBINE, COMPRESSOR, SHROUD, AND BEARING CASE FOR A TURBOCHARGER

(71) Applicant: Transportation IP Holdings, LLC, Norwalk, CT (US)

(72) Inventors: Louis Kobielski, Sherman, NY (US); Adam Felton, Grove City, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 628 days.

(21) Appl. No.: 16/828,678

(22) Filed: Mar. 24, 2020

(65) Prior Publication Data

US 2021/0025325 A1 Jan. 28, 2021

Related U.S. Application Data

(63) Continuation-in-part of application No. 16/520,268, filed on Jul. 23, 2019.

(51) Int. Cl.
*F02C 6/12* (2006.01)
*F01D 25/16* (2006.01)
*F04D 25/04* (2006.01)

(52) U.S. Cl.
CPC ............ *F02C 6/12* (2013.01); *F01D 25/16* (2013.01); *F04D 25/04* (2013.01); *F05D 2220/40* (2013.01); *F05D 2240/52* (2013.01); *F05D 2240/54* (2013.01); *F05D 2240/60* (2013.01)

(58) Field of Classification Search
CPC .... F04D 29/584; F04D 29/056; F04D 29/403; F02B 37/00; B22F 2999/00; B22F 5/009; B33Y 80/00; Y02T 10/12; F05D 2230/31; F05D 2260/231; F05D 2260/22141; F05D 2260/232; F05D 2250/25; F05D 2220/40; F01D 25/14; F02C 6/12
See application file for complete search history.

(56) References Cited

U.S. PATENT DOCUMENTS

| | | | | |
|---|---|---|---|---|
| 9,222,365 | B2* | 12/2015 | Boening | F01D 25/162 |
| 10,215,085 | B2* | 2/2019 | Yamashita | F02B 37/013 |
| 10,527,359 | B1* | 1/2020 | Roper | H05K 7/20336 |
| 2005/0017151 | A1* | 1/2005 | Battig | F02B 67/10 |
| | | | | 415/232 |
| 2011/0262695 | A1* | 10/2011 | Lee | F01D 5/182 |
| | | | | 428/131 |
| 2012/0257966 | A1* | 10/2012 | Boening | F04D 25/024 |
| | | | | 415/229 |

(Continued)

*Primary Examiner* — Charles G Freay
*Assistant Examiner* — Lilya Pekarskaya
(74) *Attorney, Agent, or Firm* — McCoy Russell LLP

(57) ABSTRACT

Various systems are provided for an axially split turbocharger case housing each of a turbine of a turbocharger, a compressor of the turbocharger, and a bearing of the turbocharger. In one example, an apparatus for an engine includes a first monolithic component and a second monolithic component that, when coupled together, form a turbocharger case configured to house each of a turbine, a compressor, and a bearing, the first and second monolithic components, when coupled together, also forming a compressor shroud and a turbine shroud. In further examples of the system, portions of the turbocharger case are formed of a lattice structure.

17 Claims, 9 Drawing Sheets

(56) References Cited

U.S. PATENT DOCUMENTS

| | | | | |
|---|---|---|---|---|
| 2012/0269624 A1* | 10/2012 | Boening | ............ | F04D 29/0563 |
| | | | | 415/229 |
| 2012/0282084 A1* | 11/2012 | Boening | ............... | F04D 29/624 |
| | | | | 415/182.1 |
| 2012/0288367 A1* | 11/2012 | Boening | ................ | F01D 25/14 |
| | | | | 29/284 |
| 2014/0157773 A1* | 6/2014 | Matthews | ............ | F02B 39/005 |
| | | | | 60/605.3 |
| 2015/0322850 A1* | 11/2015 | Vardhana | ............... | F02B 39/08 |
| | | | | 415/203 |
| 2016/0069208 A1* | 3/2016 | Parker | ................ | F04D 29/4206 |
| | | | | 415/9 |
| 2016/0215785 A1* | 7/2016 | Begin | ................. | F04D 25/024 |
| 2017/0363007 A1* | 12/2017 | Xu | .......................... | F23R 3/005 |

\* cited by examiner

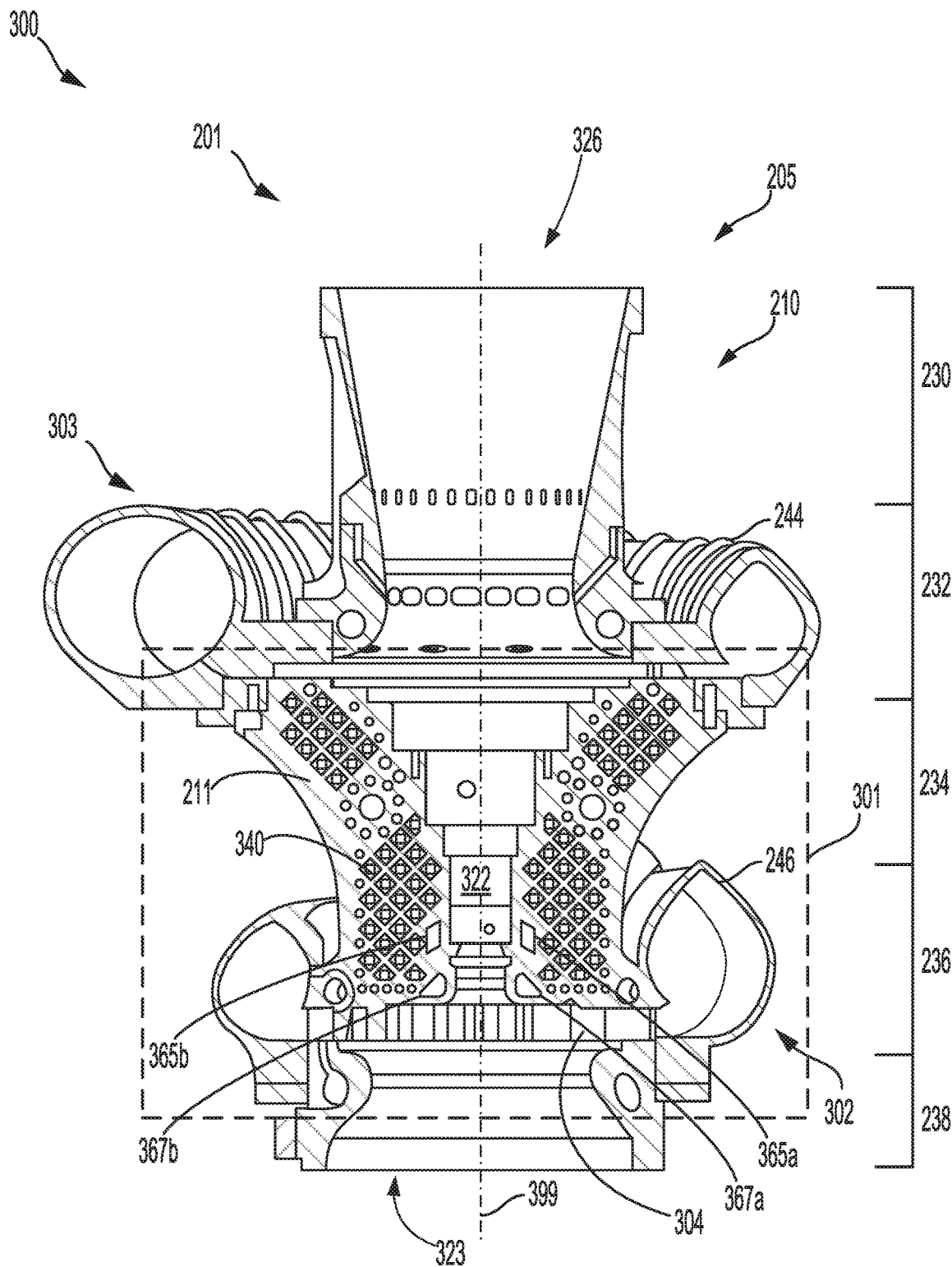
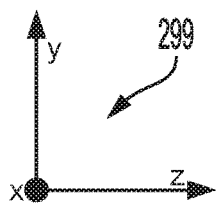
FIG. 3

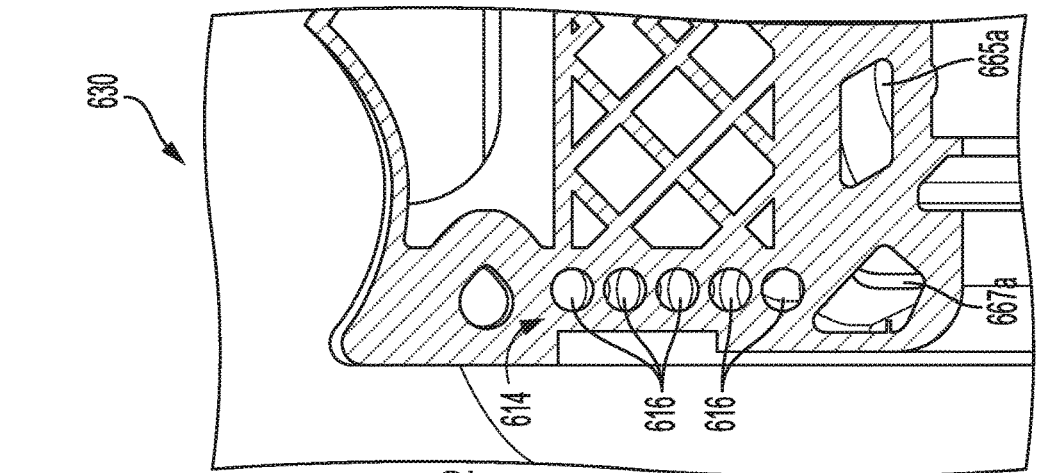
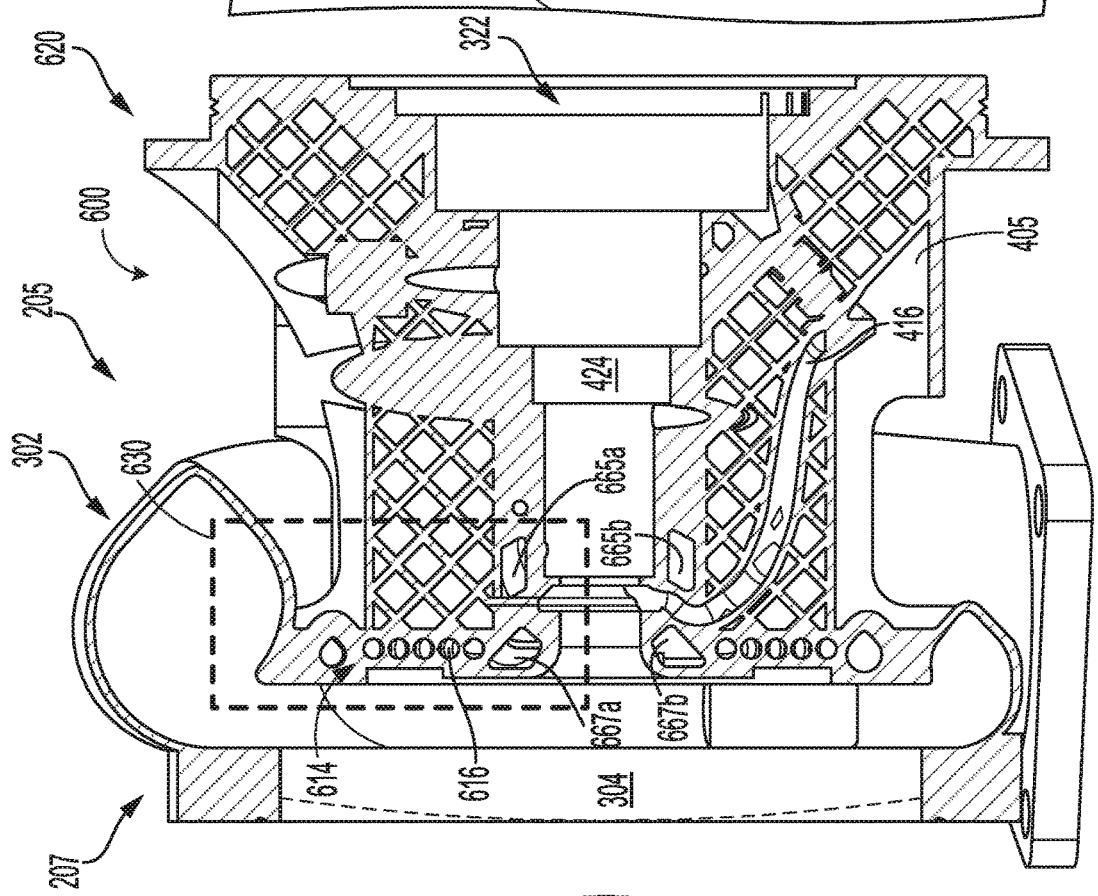
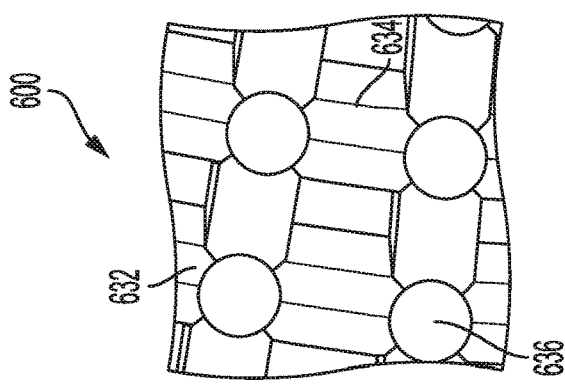
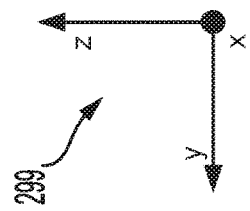

SYSTEM FOR A COMBINED TURBINE, COMPRESSOR, SHROUD, AND BEARING CASE FOR A TURBOCHARGER

CROSS REFERENCE TO RELATED APPLICATIONS

This application is a continuation-in-part of application Ser. No. 16/520,268, entitled "SYSTEM FOR A COMBINED TURBINE AND BEARING CASE FOR A TURBOCHARGER", which was filed on Jul. 23, 2019.

TECHNICAL FIELD

Embodiments of the subject matter disclosed herein relate to a printed case for housing a turbine, a compressor, and one or more bearings of a turbocharger for an engine.

DISCUSSION OF ART

Engine systems may be equipped with a turbocharger, which may allow an engine to receive boost air during some engine operating parameters to increase power output and fuel efficiency. Vanes and other similar components may be arranged in a nozzle of a turbine of the turbocharger to adjust the turbine geometry. Adjustable turbine geometry may accelerate exhaust gas therein to increase a turbine speed and increase boost.

Current turbocharger cases have separate cases for the turbine, the bearing(s), and the compressor, where adjoining cases are coupled via clamping arrangements and/or bolted joints. In a traditional turbocharger design, additional components, including compressor and turbine shrouds, are coupled to cases via additional clamping arrangements and/or bolted joints. However, the coupling of the separate cases and components presents some problems, including reliability, increased manufacturing tolerances, and maintenance difficulties such as joint degradation which may cause water leakage. Thermal stress may occur at a joint of the turbine case and the bearing case when subjected to temperature gradients during operation of the turbocharger, which causes the case to be further degraded at the joints. Further, both thermal and radial stress may occur at the joint of the turbine case and the compressor case, as each component is subject to significant and opposing radial forces during operation. Based on configuration of the case, a turbocharger may include a water cooling system for mitigating heat transfer within the cases and from the turbine to a bearing or a compressor.

BRIEF DESCRIPTION

In one embodiment, an apparatus for an engine includes a first monolithic component and a second monolithic component that, when coupled together, form a turbocharger case configured to house each of a turbine, a compressor, and a bearing, the first and second monolithic components, when coupled together, also forming a compressor shroud and a turbine shroud.

BRIEF DESCRIPTION OF THE DRAWINGS

FIG. 3 shows a cross-sectional view of the axially split turbocharger case of FIG. 2A.

FIG. 6A shows a lattice structure incorporated within at least portions of the axially split turbocharger case of FIG. 2A.

FIG. 6B shows a further cross-sectional view of the axially split turbocharger case of FIG. 2A.

FIG. 6C shows a detailed view of a thermal isolation layer in the axially split turbocharger case of FIG. 2A.

DETAILED DESCRIPTION

The following description relates to embodiments of a system for an engine including a turbocharger. The turbocharger may include a case comprised of two axially divided and monolithic sections without any joints and/or seams within each section. The case encapsulates each of a turbine wheel, a compressor wheel, and one or more bearings and also forms a turbine shroud and compressor shroud. By reducing a number of joints in the turbocharger through the axially split case, and the case further forming the turbine shroud and the compressor shroud, as described herein, buildup of thermal stresses at the turbocharger case may be controlled or reduced, thereby increasing robustness of the turbocharger assembly. A printed-in nozzle ring may be incorporated between the turbine and the bearing with one end coupled to the case surrounding the turbocharger, thereby eliminating another hot joint.

At least portions of the turbocharger case may include a grid-like lattice structure to increase structural integrity and heat transfer while reducing a weight of the structure. A targeted water cooling system may provide cooling to the turbocharger system, thereby reducing any temperature gradients formed between components. Also, a thermal isolation layer between the turbine and the bearing may reduce the temperature gradient between the two components and may allow the turbine case to be combined with the bearing case and the compressor case.

Figure 1:
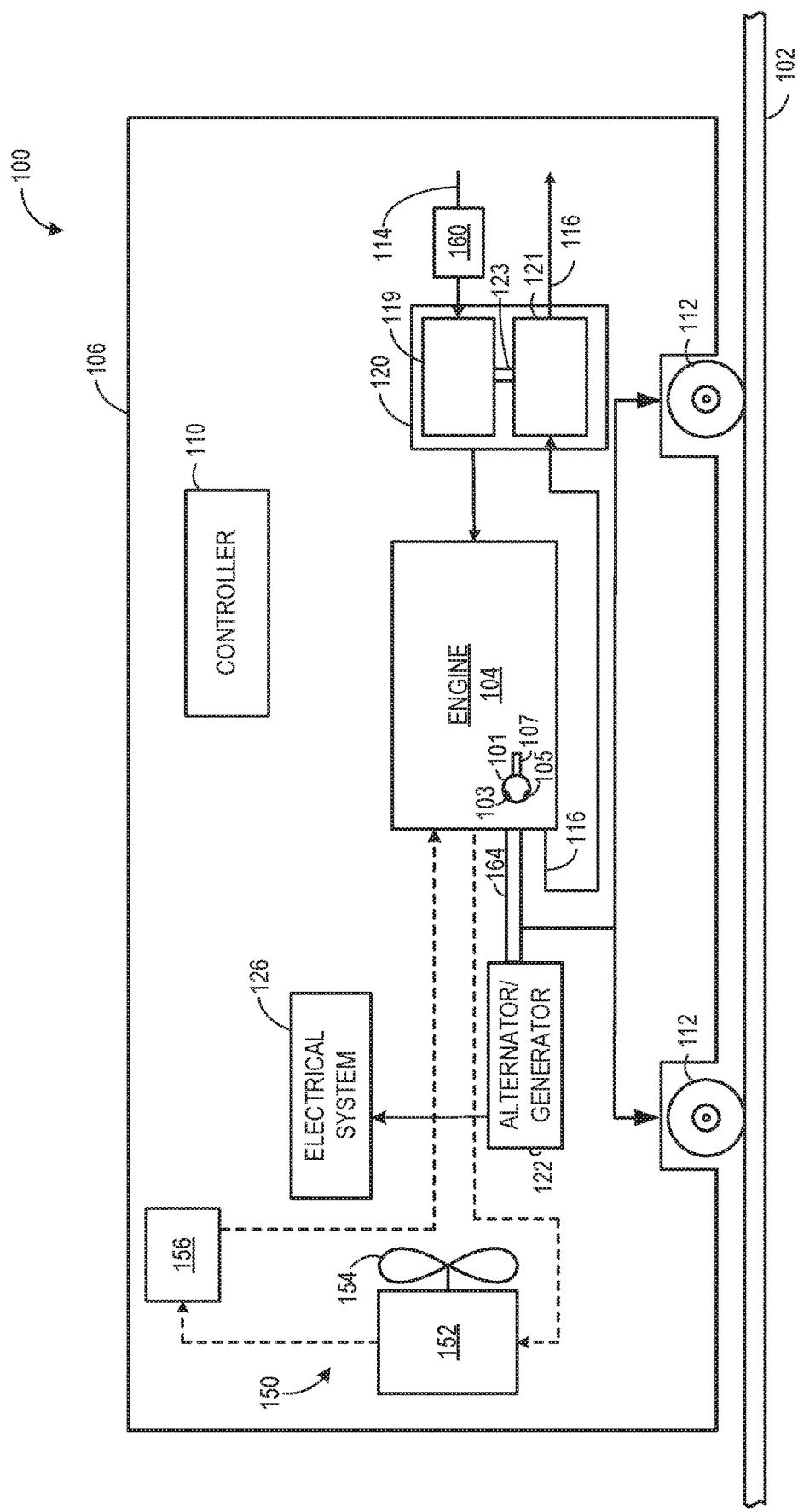
FIG. 1 shows a schematic diagram of a vehicle with an engine comprising a turbocharger arrangement, according to an embodiment of the present disclosure.
Figure 2A:
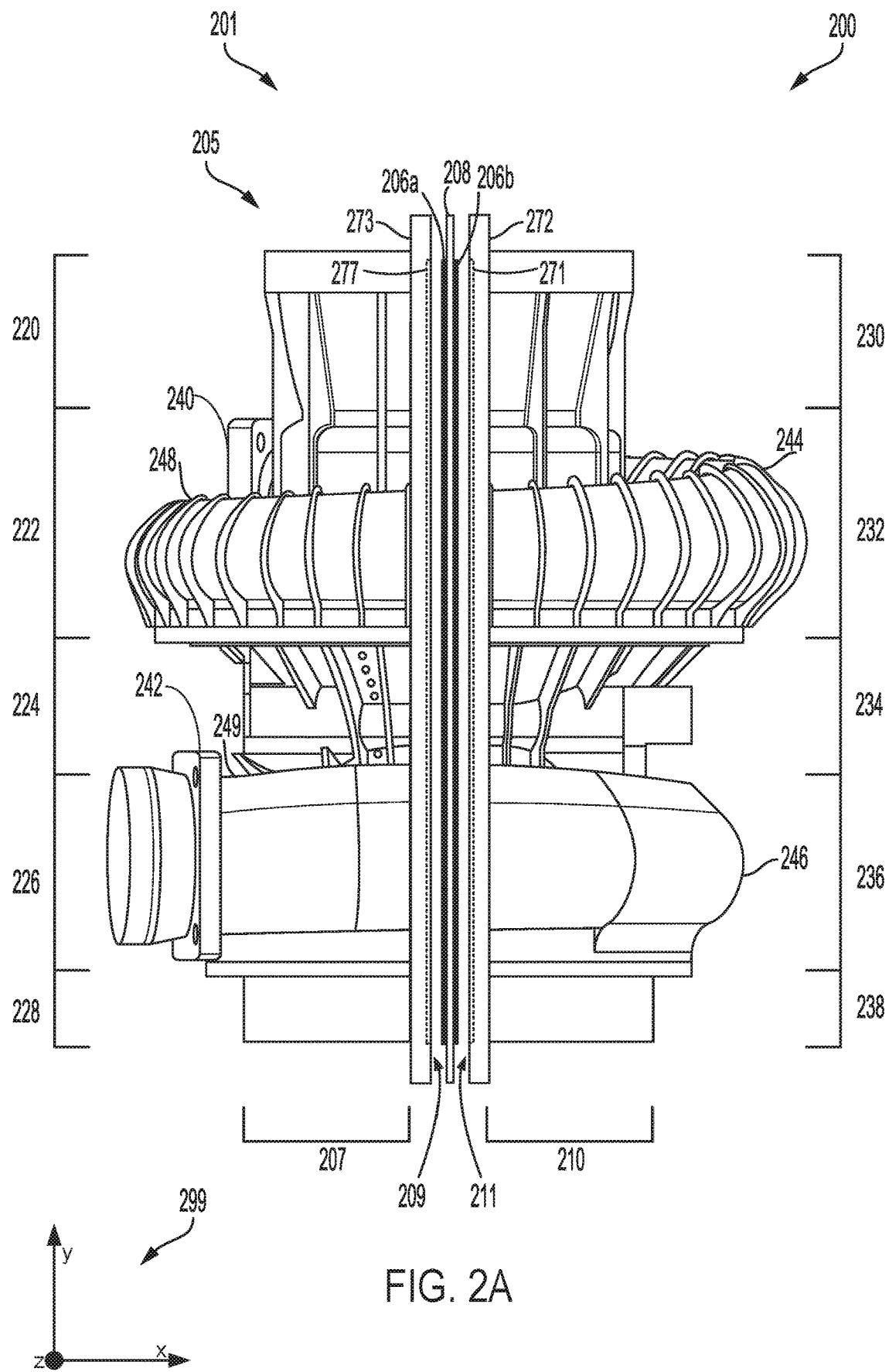
FIG. 2A shows an exploded view of an example turbocharger arrangement including an axially split turbocharger case for enclosing a turbine, one or more bearings, and a compressor.
Figure 2B:
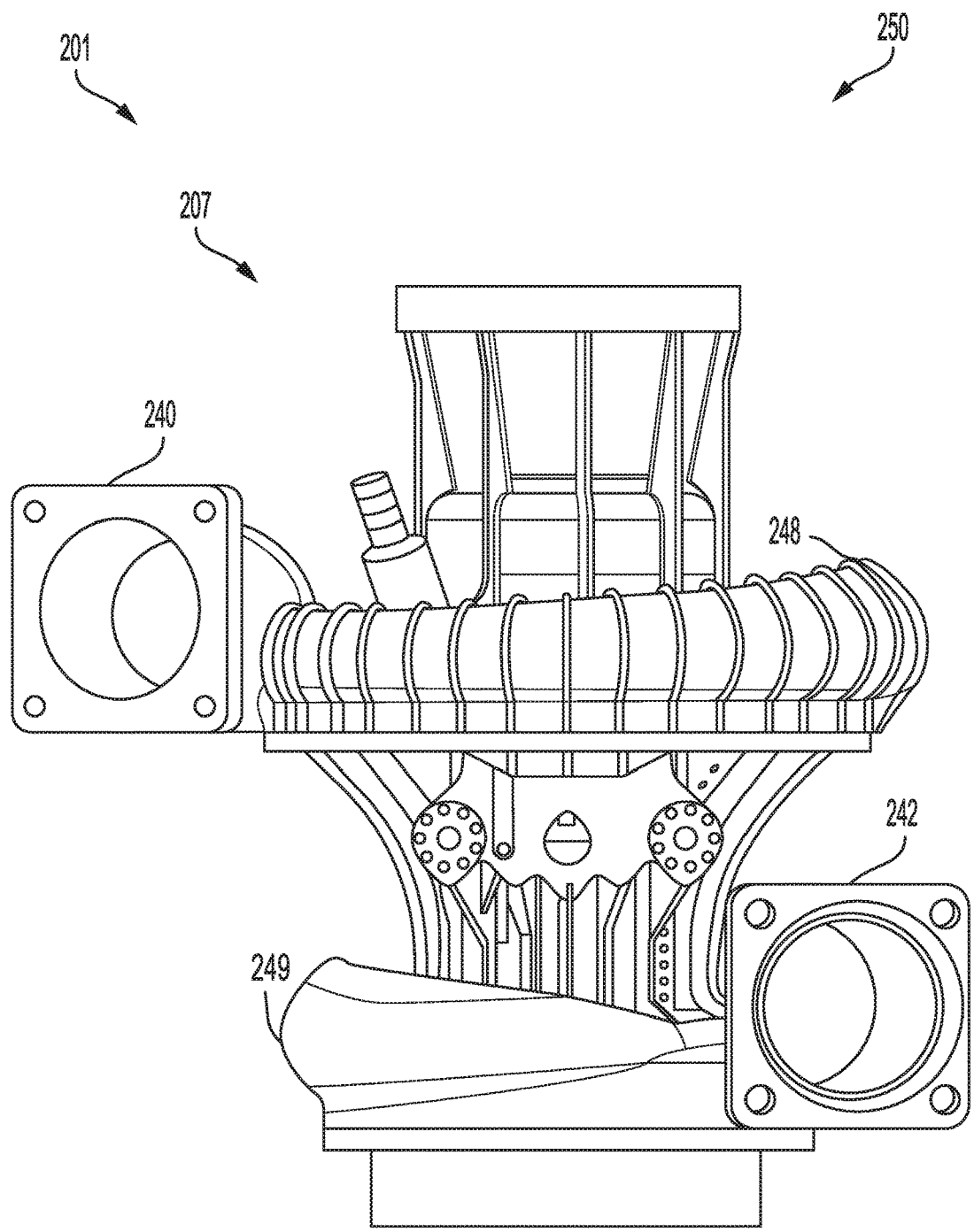
FIG. 2B shows a view of mounting brackets of the axially split turbocharger case of FIG. 2A.
Figure 4:
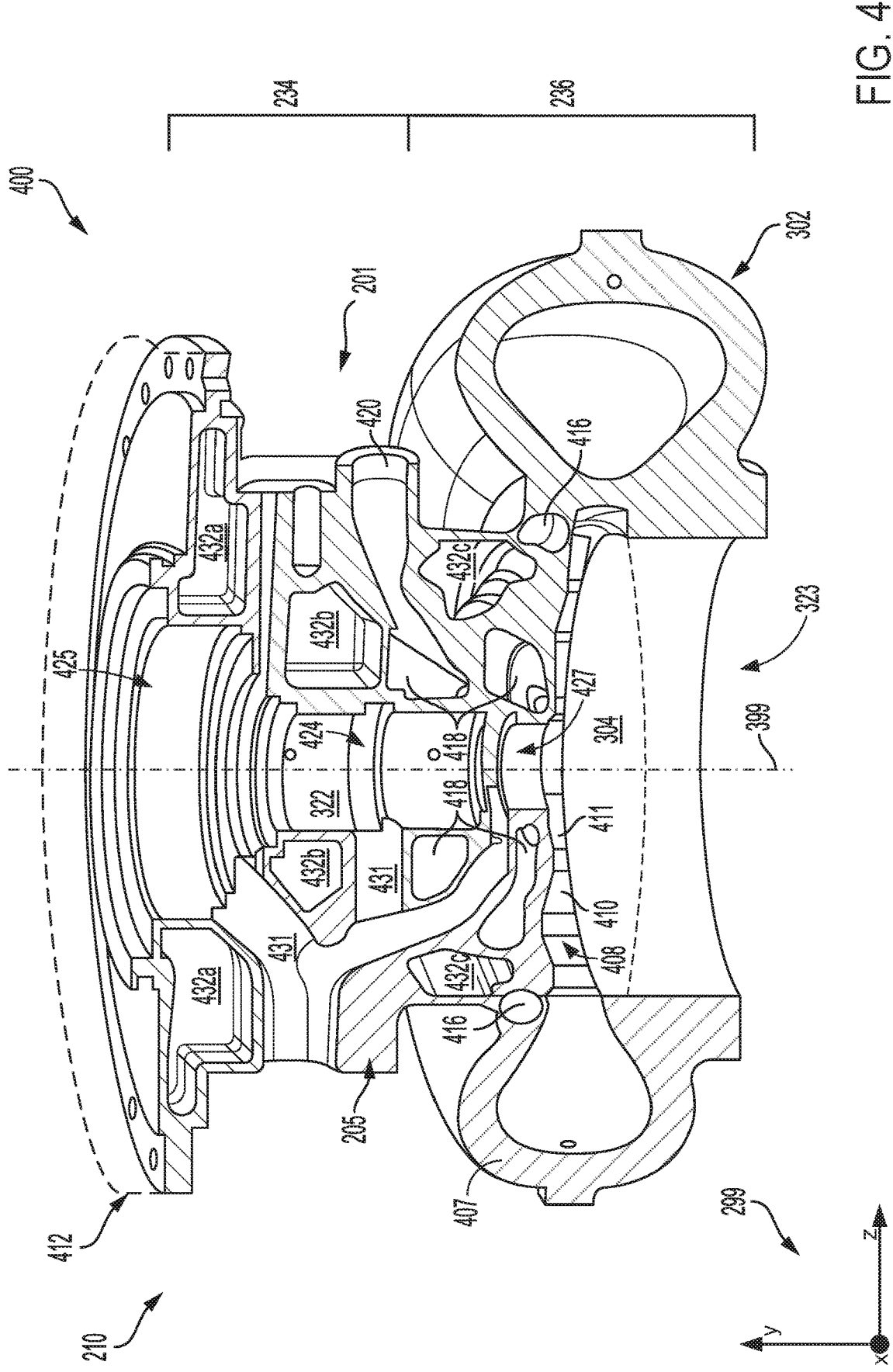
FIG. 4 shows a partial cross-sectional view of the axially split turbocharger case of FIG. 2A.
Figure 5:
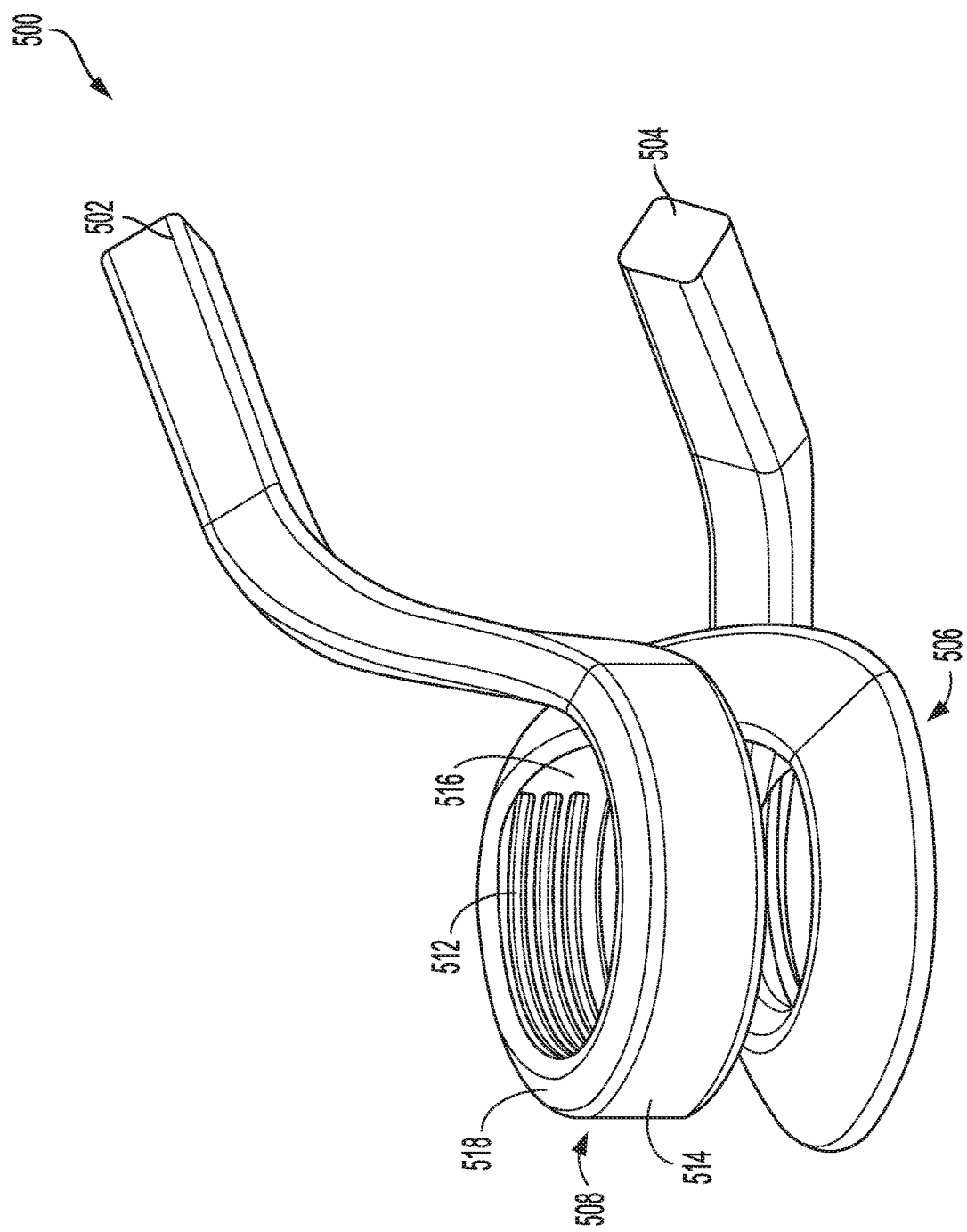
FIG. 5 shows a water cooling core for a turbocharger.
Figure 7:
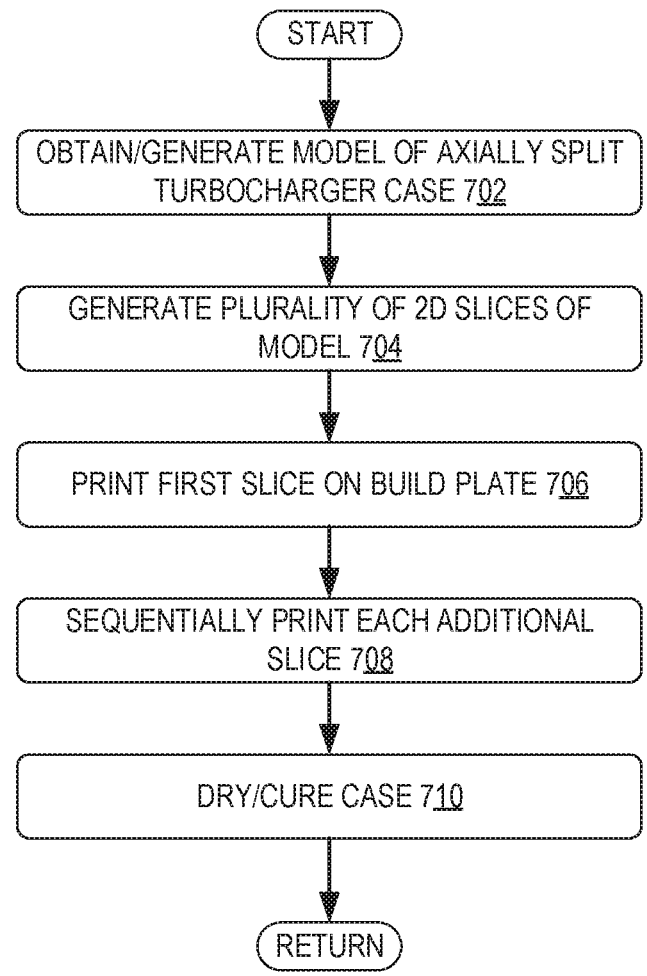
FIG. 7 shows a flowchart illustrating an example method for manufacturing an axially split turbocharger case.

In one example, the turbocharger turbine receives exhaust gas from an engine of a vehicle, and the turbocharger compressor provides compressed air to an intake of the engine, as shown in FIG. 1. An axial plane may define the two monolithic sections of the axially split turbocharger case, as shown in FIG. 2A, each monolithic section including approximately one half of the turbine case, the compressor case, the bearing case, the turbine shroud, and the compressor shroud. The axially split turbocharger case may be fastened together by a seamlessly integrated flange along a perimeter of each section, shown in FIG. 2D, and sealed with a gasket shown in FIG. 2C to form a single, complete case. The axially split case may encapsulate the turbocharger components, including the turbine wheel, the compressor, and one or more bearings, as shown in FIG. 3. At least portions of the two sections of the axially split turbocharger case may by symmetrical, with the axial plane forming a plane of reflection. However, integrated mounting stands may be included on only one half of the axially split turbocharger case, as shown in FIG. 2B. Internal components of the turbocharger turbine that are encapsulated by the axially split case are shown in FIG. 4. A spiral water cooling core, as shown in FIG. 5, may circulate cooling liquid through turbocharger components for dissipating heat and reducing temperature gradients between adjacent components. A thermal isolation barrier, as shown in FIGS. 6B-6C, may be present between the turbine and the turbine bearing to reduce heat transfer from the heated turbine components to the bearing. In one embodiment, at least parts of the axially split turbocharger case may include a lattice structure, as shown in FIG. 6A. Each of the two monolithic components of the axially split turbocharger case may be fabricated with a 3D printing process, as shown in FIG. 7, so that each monolithic component is one continuous piece without joints or seams.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles (e.g., automobiles), mining equipment, marine vessels, rail vehicles, and other off-highway vehicles (OHV). For clarity of illustration, an automobile may be provided as an example of a mobile platform supporting a system incorporating an embodiment of the disclosure.

FIG. 1 shows an embodiment of a system in which a turbocharger arrangement may be installed. Specifically, FIG. 1 shows a block diagram of an embodiment of a vehicle system 100, herein depicted as a motor vehicle 106 (e.g., automobile), configured to run on a road 102 via a plurality of wheels 112. As depicted, the motor vehicle 106 includes an engine 104. The engine includes a plurality of cylinders 101 (only one representative cylinder shown in FIG. 1) that each include at least one intake valve 103, at least one exhaust valve 105, and at least one fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 includes an air filter 160 that filters air from outside of the motor vehicle. Exhaust gas resulting from combustion in the engine is supplied to an exhaust passage 116. Exhaust gas flows through the exhaust passage 116 and out of an exhaust system of the motor vehicle. Combustion in the cylinder drives rotation of a crankshaft 164. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally or alternatively combust fuel including gasoline, kerosene, natural gas, biodiesel, or other petroleum distillates of similar density through compression ignition (and/or spark ignition).

As depicted in FIG. 1, the engine is coupled to an electric power generation system that includes an alternator/generator 122. For example, the engine is a diesel and/or natural gas engine that generates a torque output that is transmitted to the alternator/generator 122, which is mechanically coupled to the crankshaft 164, as well as to at least one of the plurality of wheels 112 to provide motive power to propel the motor vehicle. The alternator/generator 122 produces electrical power that may be stored and applied for subsequent propagation to a variety of downstream electrical components. In one example, the alternator/generator 122 may be coupled to an electrical system 126. The electrical system 126 may include one or more electrical loads configured to run on electricity generated by the alternator/generator 122, such as vehicle headlights, a cabin ventilation system, and an entertainment system, and may further include an energy storage device (e.g., a battery) configured to be charged by electricity generated by the alternator/generator 122. In some examples, the vehicle may be a diesel electric vehicle, and the alternator/generator 122 may provide electricity to one or more electric motors to drive the wheels 112.

The vehicle system may include a turbocharger 120 that is arranged between the intake passage and the exhaust passage. The turbocharger 120 increases an air charge of ambient air drawn into the intake passage in order to provide greater charge density during combustion to increase power output and/or engine operating efficiency. The turbocharger 120 may include at least one compressor 119, which is at least partially driven by at least one corresponding turbine 121 via a turbocharger shaft 123. Further, the turbocharger 120 may be oriented such that the turbocharger shaft 123 is perpendicular to the crankshaft 164, as shown in FIG. 1.

In some embodiments, the vehicle system may further include an aftertreatment system coupled in the exhaust passage upstream and/or downstream of the turbocharger 120. In one embodiment, the aftertreatment system may include one or more emission control devices. Such emission control devices may include a selective catalytic reduction (SCR) catalyst, a three-way catalyst, a $NO_x$ trap, or various other devices or exhaust aftertreatment systems. In another embodiment, the aftertreatment system may additionally or alternatively include a diesel oxidation catalyst (DOC) and a diesel particulate filter (DPF).

As depicted in FIG. 1, the vehicle system further includes a cooling system 150 (e.g., an engine cooling system). The cooling system 150 circulates coolant through the engine 104 to absorb waste engine heat and distribute the heated coolant to a heat exchanger, such as a radiator 152 (e.g., a radiator heat exchanger). In one example, the coolant may be water. A fan 154 may be coupled to the radiator 152 in order to maintain an airflow through the radiator 152 when the vehicle is moving slowly or stopped while the engine 104 is running. In some examples, fan speed may be controlled by the controller 110. Coolant that is cooled by the radiator 152 may enter a tank (not shown). The coolant may then be pumped by a water, or coolant, pump 156 back to the engine or to another component of the vehicle system.

The controller 110 may be configured to control various components related to the motor vehicle. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of motor vehicle operation. In some examples, the controller 110 may include more than one controller each in communication with one another, such as a first controller to control the engine and a second controller to control other operating parameters of the vehicle (such as engine load, engine speed, brake torque, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine and/or vehicle, may be configured to receive signals from a variety of engine sensors, as further elaborated herein, in order to determine operating parameters and operating conditions, and correspondingly adjust various engine actuators to control operation of the engine and/or vehicle. For example, the controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller 110 may control the engine and/or the vehicle by sending commands to various components such as the one or more electric motors 124, the alternator/generator 122, fuel injectors 107, valves, coolant pump 156, or the like. For example, the controller 110 may control the operation of a restrictive element (e.g., such as a valve) in the engine cooling system. Other actuators may be coupled to various locations in the vehicle.

Herein, description is directed to a turbocharger, such as the turbocharger 120 shown in FIG. 1, which may include a fluidic variable turbine, wherein a throat area of the turbine may be adjusted based on engine conditions. In one example, the engine condition is an engine power level (e.g., notch level) and/or an engine load. As the engine power level decreases, it may be desired to decrease a throat area of the turbine.

In one example, fluidic variable turbines may include mechanically movable vanes or stationary vanes with a movable component such as a shroud or other similar device. By moving the vanes or an adjacent component, a throat area of the turbine is adjusted to adjust a speed of airflow through the turbine and increase boost provided by a current level of exhaust gas production. In another example, a plurality of stationary nozzle vanes in a turbine may inject various amounts of air into the turbine nozzle to adjust a throat area of the nozzle through fluidic blocking. A flow control system outside of the turbine may be arranged for the stationary nozzle vanes inside of the turbine. For example, such a system may reduce a number of mechanical components within the turbine. Additionally, the nozzle vanes and flow control system may provide a greater degree of control over adjusting the area of the turbine such that a greater range of boost may be achieved.

Some turbochargers may comprise a turbine case housing a turbine wheel, a compressor case housing a compressor wheel, and a bearing case surrounding a shaft and associated bearings connecting the turbine wheel to the compressor wheel and arranged between the turbine case and compressor case. Some turbochargers may additionally comprise a turbine shroud and/or a compressor shroud. A plurality of bolts may mutually couple the turbine case, the compressor case, the bearing case, the compressor shroud, and/or the turbine shroud. However, such discrete cases may have shortcomings. For example, during turbocharger operation, due to unequal heating of the turbine components (the turbine expanding more than a bearing), thermal stress may be generated at the joint between the turbine case and the bearing case. Such thermal stresses may cause mechanical degradation of the joints, thereby creating leaks in the turbocharger system. Additionally, manufacture of such separate cases may be cumbersome, as multiple components are to be manufactured and a plurality of tools are required for coupling the individual cases, thereby increasing production complexity.

In one example, the present disclosure addresses the above-described issues with an axially split, combined turbocharger case that may encapsulate the turbine wheel, the compressor wheel, and the bearing with only one joint and/or seam. A nozzle ring with vanes may be integrated with the case to further decrease the number of individual components, at least in some embodiments. A targeted water cooling system with a plurality of fluidic passages may be disposed across the case to provide cooling to areas of the case that may be exposed to temperature gradients during turbocharger operation.

Turning now to FIGS. 2A-6C, example views of an axially split turbocharger are shown. FIGS. 2A-6C will be described collectively, with like components numbered the same and not reintroduced between figures. FIGS. 2A-6C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 299 are included in each of FIGS. 2A-4 and FIG. 6B in order to compare the views and relative orientations described below. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-6C are drawn approximately to scale, although other dimensions or relative dimensions may be used.

Turning first to FIG. 2A, an exploded view 200 of a turbocharger case 205 of a turbocharger 201 is shown. The turbocharger case 205 may encase a turbine, a bearing, and a compressor, such that the turbocharger 201 may be used similarly to turbocharger 120 of FIG. 1 and may be included as the turbocharger in FIG. 1 in some embodiments. The view 200 shown in FIG. 2A is in the x-y plane, as indicated by reference axes 299. The y-axis is parallel to an axis of rotation of the turbocharger, such as parallel to a shaft of the turbocharger (e.g., the turbocharger shaft 123 of FIG. 1). Further, the turbocharger case 205 is divided axially along the y-z plane relative to reference axes 299.

The turbocharger case 205 shown in FIG. 2A comprises two monolithic components, including a first monolithic component 207 and a second monolithic component 210, and may further include a gasket 208 that fluidically seals the two components, as will be elaborated below. Each of the two monolithic components may be 3D printed such that each component contains no joints or seams. However, in other examples, each half of the axially split turbocharger case 205 may include more than one component.

Each of the two monolithic components 207 and 210 includes a compressor case portion, a bearing case portion, a turbine case portion, a compressor shroud portion, and a turbine shroud portion. Each of the two monolithic components 207 and 210 may further include a compressor volute portion and a turbine volute portion. Further, one or both of the two monolithic components may include a mounting bracket(s) for attaching the turbocharger case 205 to an engine, as shown in FIG. 2B and described in more detail below.

In the embodiment shown, the first monolithic component 207 includes a first compressor shroud portion 220, a first compressor case portion 222, a first bearing case portion 224, a first turbine case portion 226, a first turbine shroud portion 228, a first compressor volute portion 248, and a first turbine volute portion 249. The first compressor shroud portion 220, the first compressor case portion 222, the first bearing case portion 224, the first turbine case portion 226, the first turbine shroud portion 228, the first compressor volute portion 248, and the first turbine volute portion 249 are seamlessly integrated within the first monolithic component 207. For example, the first monolithic component 207 extends from a first end at the first compressor shroud portion 220 to a second end at the first turbine shroud portion 228 without any joints or seams. As such, the first compressor shroud portion 220 may be seamlessly integrated with the first compressor case portion 222, the first compressor case portion 222 may be seamlessly integrated with the first bearing case portion 224, the first bearing case portion 224 may be seamlessly integrated with the first turbine case portion 226, and the first turbine case portion 226 may be seamlessly integrated with the first turbine shroud portion 228. Further, the first compressor volute portion 248 may be seamlessly integrated with the first compressor case portion 222, and the first turbine volute portion 249 may be seamlessly integrated with the first turbine case portion 226.

Similarly, the second monolithic component 210 includes a second compressor shroud portion 230, a second compressor case portion 232, a second bearing case portion 234, a second turbine case portion 236, a second turbine shroud portion 238, a second compressor volute portion 244, and a second turbine volute portion 246. The second compressor shroud portion 230, the second compressor case portion 232, the second bearing case portion 234, the second turbine case portion 236, the second turbine shroud portion 238, the second compressor volute portion 244, and the second turbine volute portion 246 are seamlessly integrated within the second monolithic component 210. For example, the second monolithic component 210 extends from a first end at the second compressor shroud portion 230 to a second end at the second turbine shroud portion 238 without any joints or seams. As such, the second compressor shroud portion 230 may be seamlessly integrated with the second compressor case portion 232, the second compressor case portion 232 may be seamlessly integrated with the second bearing case portion 234, the second bearing case portion 234 may be seamlessly integrated with the second turbine case portion 236, and the second turbine case portion 236 may be seamlessly integrated with the second turbine shroud portion 238. Further, the second compressor volute portion 244 may be seamlessly integrated with the second compressor case portion 232, and the second turbine volute portion 246 may be seamlessly integrated with the second turbine case portion 236.

Each of the first monolithic component 207 and the second monolithic component 210 includes an interior planar surface proximate to the gasket 208. As shown, the first monolithic component 207 includes a first interior planar surface 209, and the second monolithic component 210 includes a second interior planar surface 211. Although referred to as planar surfaces, the first interior planar surface 209 and the second interior planar surface 211 may include one or more cutouts, indentations, hollow portions, channels and/or grooves to accommodate the gasket 208 as well as additional components of the turbocharger 201. For example, the gasket 208 may include one or more raised portions, such as ridges or lips, that stand out in relief from a planar surface of the gasket 208. As shown by dashed lines, the first interior planar surface 209 includes a groove 277, and the second interior planar surface 211 includes a groove 271. The groove 277 is shaped to receive a first ridge 206a of the gasket 208, the first ridge 206a located on a first planar surface of the gasket 208 that faces the first interior planar surface 209 of the first monolithic component 207, and the groove 271 is shaped to receive a second ridge 206b of the gasket 208, the second ridge 206b located on a second planar surface of the gasket 208 that faces the second interior planar surface 211 of the second monolithic component 210. As an example, each of groove 271 and groove 277 may be at an approximately constant offset from an outer edge of the corresponding monolithic component. Further, each of the first ridge 206a and the second ridge 206b may be shaped complementary to the corresponding groove. For example, a height (e.g., in the x-direction) and width (e.g., in the z-direction) of first ridge 206a may be substantially equal to a depth (e.g., in the x-direction) and width (e.g., in the z-direction) of groove 277, and a height and width of second ridge 206b may be substantially equal to a depth and width of groove 271.

As will be elaborated below, the interior planar surface of each monolithic component enables the first monolithic component 207 to be fastened to the second monolithic component 210, with the gasket 208 positioned therebetween, to form a single turbocharger unit. For example, the first compressor shroud portion 220 joins with the second compressor shroud portion 230 to form a unitary compressor shroud, the first compressor case portion 222 joins with the second compressor case portion 232 to form a unitary compressor case, etc. Further, when the first monolithic component 207 and the second monolithic component 210 are coupled together, the first ridge 206a is positioned within the groove 277 and the second ridge 206b is positioned within the groove 271.

Figure 2D:
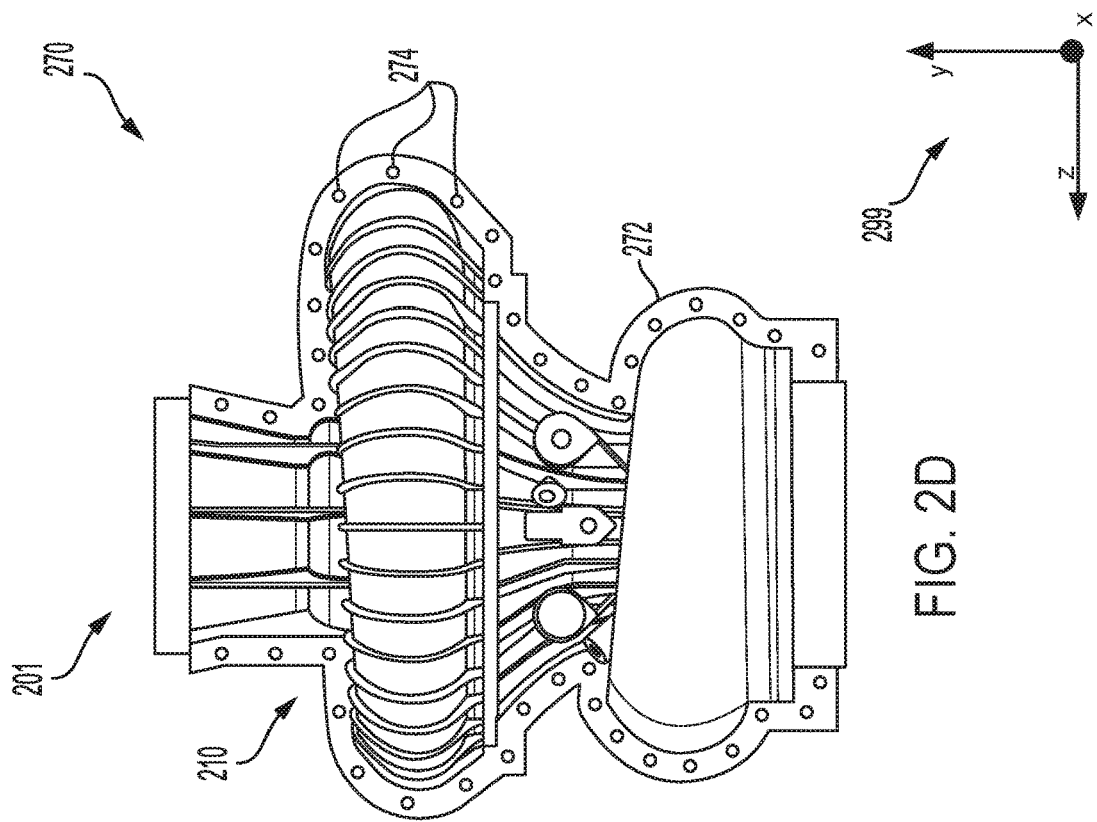
FIG. 2D shows a view of a flange for fastening the axially split turbocharger case of FIG. 2A.

As will be further described with respect to FIG. 2D, a flange 273 positioned along the perimeter of the first interior planar surface 209 may be mated with a flange 272 positioned along the perimeter of the second interior planar surface 211 of the second monolithic component 210 to form the single turbocharger unit with a single longitudinal seam that extends from the compressor shroud to the turbine shroud. Each flange is seamlessly integrated into the turbocharger case 205 along the axial split, such that the flanges 273 and 272 are parallel with the y-z plane defined by reference axes 299. As an example, the groove 277 may be positioned within and defined by the flange 273, and the groove 271 may be positioned within and defined by the flange 272.

The first monolithic component 207 further includes a compressor mounting bracket 240 and a turbine mounting bracket 242 for coupling the turbocharger to an engine intake and exhaust, respectively. Each of the two mounting brackets are seamlessly integrated into the first monolithic component 207. An additional view 250 of the first monolithic component 207 is shown in FIG. 2B, further highlighting the positioning of the mounting brackets on the first monolithic component 207. The view 250 shown in FIG. 2B is in the y-z plane, as indicated by reference axes 299. However, in other examples, the second monolithic component 207 may include mounting brackets, or each of the first monolithic component 207 and the second monolithic component 210 may include one mounting bracket.

The turbine mounting bracket 242 is seamlessly integrated with the first turbine volute portion 249 and may serve as an inlet to the turbine. For example, when the turbine mounting bracket 242 is coupled to the engine, both the first turbine volute portion 249 and the second turbine volute portion 246 may be fluidically coupled to the engine such that at least a portion of the exhaust from the engine may enter the first turbine volute portion 249 and flow through the turbocharger case 205. As another example, the compressor mounting bracket 240 is seamlessly integrated with the first compressor volute portion 248 and may serve as an outlet of the compressor. When the compressor mounting bracket 240 is coupled to the engine, both the first compressor volute portion 248 and the second compressor volute portion 244 may be fluidically coupled to the engine such that at least a portion of intake air to the engine may flow through the turbocharger case 205 and out of the first compressor volute portion 248.

Figure 2C:
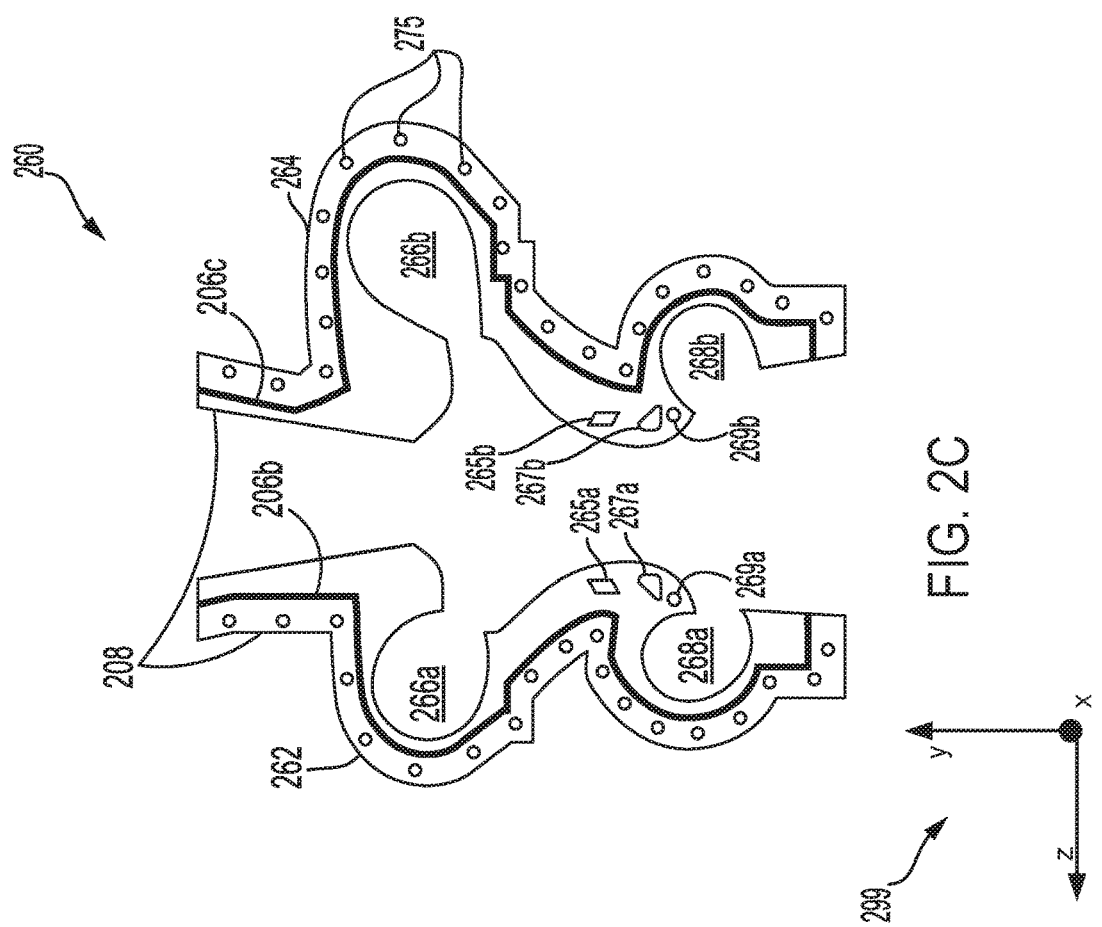
FIG. 2C shows a view of a gasket of the axially split turbocharger case of FIG. 2A.

As mentioned above, gasket 208 seals a joint (e.g., seam) between first monolithic component 207 and second monolithic component 210 when first monolithic component 207 and second monolithic component 210 are coupled to each other at the first interior planar surface 209 and the second interior planar surface 211, respectively. Turning to FIG. 2C, a y-z planar view 260 of gasket 208 is shown, as indicated by reference axes 299. The gasket 208 may comprise one or more planar pieces that include a plurality of cutouts and at least one raised portion that protrudes from the planar surface of the gasket 208, as described above with respect to FIG. 2A. Unless otherwise specified, a "cutout" is passage or other void that may be at least partially formed via an additive manufacturing process, via a cutting or other machining process, or the like.

As shown, the gasket 208 includes a first gasket component 262 and a second gasket component 264. The first gasket component 262 includes a first compressor volute cutout 266a, a first turbine volute cutout 268a, a first conduit cutout 269a, and cooling passage cutouts 265a and 267a. The second gasket component 264 includes a second compressor volute cutout 266b, a second turbine volute cutout 268b, a second conduit cutout 269b, and cooling passage cutouts 265b and 267b. The first gasket component 262 includes the second ridge 206b, and although not visible in the planar view 260, it may be understood that the first ridge 206a (see FIG. 2A) may be positioned on the underside of the first gasket component 262. The planar view 260 also shows a third ridge 206c positioned on the second gasket component 264, and it may be understood that a fourth ridge may be positioned on the underside of the second gasket component 264. The gasket 208 further includes a plurality of holes 275, which may align with corresponding holes in the flanges 272 and 273 shown in FIG. 2A and as elaborated below with respect to FIG. 2C. The plurality of holes 275 may enable fasteners to pass through the gasket 208 and facilitate positioning of the gasket between the first and second monolithic components. Further, as elaborated above with respect to FIG. 2A, the ridges 206b and 206c of gasket 208 may be shaped to fit into one or more recessed grooves in the second interior planar surface 211 of the second monolithic component 210, such as within or proximate to the flanges 273 and 272, which may align the plurality of cutouts with corresponding passages in the first monolithic component 207 and the second monolithic component 210. As such, fluid (e.g., gas or liquid) may flow from a passage of the first monolithic component 207 to a corresponding passage of the second monolithic component 210 without being blocked by the gasket 208. In this way, the first monolithic component 207, the gasket 208, and the second monolithic component 210 form a continuous, composite passage.

Additionally, the gasket 208 may fluidically seal the passages of the first monolithic component 207 to the corresponding passages of the second monolithic component 210 such that fluid does not escape from each composite passage. The gasket 208 may be comprised of one or more compressible materials, such as metal, neoprene, nitrile, polytetrafluoroethylene, or other fibers or polymers configured to deform under compression to fill any gaps between the first interior planar surface 209 and the second interior planar surface 211. Additionally or alternatively, a sealant may be used to secure the joint between the first monolithic component 207 and the second monolithic component 210.

Turning now to FIG. 2D, a view 270 shows the flange 272 along the perimeter of the second monolithic component 210. Note that an x-y planar view of the flange 273 of the first monolithic component 207 is shown in FIG. 2A, although the flange 273 is obscured in the view 270. Further, the flange 273 of the first monolithic component 207 is seamlessly integrated with the first interior planar surface 209 such that the flange 272 is located in the same plane (e.g., with respect to the x-direction) as the first interior planar surface 209, and the flange 272 of second monolithic component 210 is seamlessly integrated with the second interior planar surface 211 such that the flange 273 is located in the same plane (e.g., with respect to the x-direction) as the second interior planar surface 211. The two flanges (e.g., flange 272 and flange 273) are positioned such that they are in face-sharing contact with the gasket 208 when the two monolithic turbocharger components are joined along their interior planar surfaces.

The first monolithic component 207 may be coupled to the second monolithic component 210 by bolts, rivets, or other fasteners. As an example, a plurality of holes 274 in the flange 272 of the second monolithic component 210 may align with corresponding holes in the flange 273 of the first monolithic component 207. For example, each of the bolts, rivets, or other fasteners may pass through one of the plurality of holes of the flange of the first monolithic component 207, the aligned hole 275 in the gasket, and the aligned hole of the flange 272 of the second monolithic component 210 to hold the two flanges in direct, face-sharing contact with the gasket 208. When the mating flanges are brought together into direct, face-sharing contact with the gasket 208, the first interior planar surface 209 of the first monolithic component and the second interior planar surface 211 of the second monolithic component 210 are also bought into face-sharing contact with the gasket 208. Further, by fastening the first monolithic component 207 to the second monolithic component 210 via the flanges 272 and 273 and fasteners, the first monolithic component 207 and the second monolithic component 210 may be fixedly but removably coupled to each other. However, in other examples, the flanges may be replaced with a welded or otherwise fused (e.g., permanent) joint.

As elaborated above, when installed in an engine system, the direction of the split may be perpendicular to a crankshaft of the engine. For example, as described above with respect to FIG. 1, the shaft of the turbocharger 120 is perpendicular to the crankshaft 164 of the engine 104. Thus, because the axial plane of the split is parallel to the shaft of turbocharger 120, the split in the turbocharger case 205 may be perpendicular to the crankshaft of the engine. As an example, the first interior planar surface 209 and the second interior planar surface 211 are both parallel to the shaft of the turbocharger 120 and perpendicular to the crankshaft of the engine.

Further, the rotation of the axial plane of the split about the y-axis is provided by way of example. For example, in other embodiments the plane of the axial split may be rotated 90 degrees about the y-axis, resulting in a different division of the turbocharger case 205 between the first monolithic component 207 and the second monolithic component 210 without changing an overall configuration of the unitary case. In this way, the turbocharger case 205 is split axially along a plane defined by the turbocharger shaft and the engine crankshaft, such that the turbocharger case comprises two monolithic components that mate together along interior planar surfaces, thus forming a complete turbocharger case for the turbocharger 201.

Turning now to FIG. 3, a partial, y-z planar view 300 of the turbocharger 201 is shown, including the second monolithic component 210 of the turbocharger case 205. The cross-sectional view is defined by the same axial cut illustrated in FIG. 2A, as indicated by reference axes 299, such that interior planar surface 211 is shown, although the flange 272 and the groove 271 are not shown for illustrative clarity. In one example, the turbocharger 201 is a radial turbocharger. For example, the larger size and additional components of an axial turbocharger may make fabrication of an axially-split casing as described herein impractical if applied to an axial turbocharger. An inset box 301 will be described in detail below with respect to FIG. 4, which provides a more detailed cross-sectional view of the portion of the turbocharger 201 within the inset box 301.

The turbocharger 201 comprises a turbine 302, including a turbine wheel 304, and a compressor 303, including a compressor wheel (not shown). The turbine wheel 304 may be mechanically (e.g., rotationally) coupled to the compressor wheel via a shaft 322 extending along a central axis 399 of the turbocharger case 205. Exhaust gases from an engine (e.g., engine 104 of FIG. 1) may enter the turbine through a turbine inlet volute (partially shown as the second turbine volute portion 246) and exit the turbine via a turbine outlet 323. The volute shape of the exhaust gas inlet may distribute the exhaust gas around the turbine wheel in a 360° manner. Further, the turbine shroud (partially shown as the second turbine shroud portion 238) may be seamlessly integrated with the turbine case (partially shown as the second turbine case portion 236) at the turbine outlet 323.

Prior to exiting the turbine via the turbine outlet 323, the exhaust gases may rotate the turbine wheel 304, the energy of which may be transferred along the shaft 322 and to the compressor wheel. The compressor wheel may compress intake air entering the compressor 303 via a compressor inlet 326 such that compressed air exits the compressor via the compressor outlet volute (partially shown as the second compressor volute portion 244). As an example, outside air may enter the compressor through the compressor inlet 326 and exit the compressor via the compressor outlet volute. Further, the compressor shroud (partially shown as the second compressor shroud portion 230) may be seamlessly integrated with the compressor case (partially shown as the second compressor case portion 232) at the compressor inlet 326. The volute shape of the intake gas inlet may distribute the intake gas around the compressor wheel in a 360° manner. Prior to exiting the compressor 303, intake gases are compressed by the rotation of the compressor wheel, which is powered by the rotation of the shaft 322 by the turbine 302.

As described in FIG. 2A, the second monolithic component 210 includes the second compressor shroud portion 230, the second compressor portion 232, the second bearing case portion 234, the second turbine portion 236, and the second turbine shroud portion 238. Because turbocharger case 205 is comprised of two monolithic components, assembled with only one joint or seam, the design of turbocharger 201 differs from a traditional turbocharger design. Specifically, traditional turbocharger cases include separate casings for the turbine, the compressor, and the bearing. These components are divided radially rather than axially. For example, a traditional turbocharger case may include a seam between a turbine case and a bearing case (e.g., between the second turbine case portion 236 and the second bearing case portion 234 shown in FIG. 3), with the turbine case and the bearing case comprised of separate components that are fastened together. As another example, a traditional turbocharger case may include a seam between the bearing case and a compressor case (e.g., between the second bearing case portion 234 and the second compressor case portion 232 shown in FIG. 3). Further, a traditional turbocharger case may include a separate compressor shroud that is fastened to the compressor case and a separate turbine shroud that is fastened to the turbine case. Due to rotational forces from the turbine wheel and the compressor wheel, the radial joints found in traditional turbocharger designs are subject to radial stress. By splitting the turbocharger case 205 axially rather than radially and seamlessly incorporating a turbine shroud portion, a turbine case portion, to bearing case portion, a compressor case portion, and a compressor shroud portion in each axial component, the number of joints is reduced and subjected to less radial stress.

In addition to radial stress, turbocharger cases are also subjected to thermal stress due to a temperature gradient between the turbine case and the bearing case, for example. The turbine 302 is subjected to heat from the exhaust gas during operation. The turbocharger case 205 may utilize a lattice cooling structure 340 to reduce thermal strain and provide increased strength and structural integrity to the turbocharger case 205. The lattice cooling structure 340 is described in more detail in FIGS. 6A-6C below. In this example, the lattice cooling structure 340 is included on the second interior planar surface 211. It may be understood that the lattice cooling structure 340 may be symmetric across the longitudinal axis of the seam between the first monolithic component 207 and the second monolithic component 210.

Further, the second interior planar surface 211 includes a plurality of cooling passage cutouts 365a, 365b, 367a, and 367b. Each cooling passage cutout may align with a corresponding cutout on the first interior planar surface 209 of the first monolithic component 207 (not shown in FIG. 3) as well as a corresponding cutout in the gasket 208 shown in FIG. 2C. For example, the cooling passage cutout 365a may align with the cooling passage cutout 265a of the gasket 208, the cooling passage cutout 367a may align with the cooling passage cutout 267a, the cooling passage cutout 365b may align with the cooling passage cutout 265b of the gasket 208, and the cooling passage cutout 367b may align with the cooling passage cutout 267b of the gasket 208. In this way, coolant may flow between the first monolithic component 207 to the second monolithic component 210 in a single fluidically passage, as will be further described below with respect to FIG. 5.

Turning to FIG. 4, a detailed partial view 400 of the turbocharger 201 is shown, as defined by the inset box 301 of FIG. 3A. A different cross-section of the second monolithic component 210 is shown in partial view 400 than in the view 300 of FIG. 3 in order to highlight internal components of the turbocharger 201. View 400 of FIG. 4 shows components housed within or formed by the second turbine case portion 236 and the second bearing case portion 234 of the second monolithic component 210 of the turbocharger case 205. It may be understood that the first monolithic component 207 introduced in FIG. 2A may include similar features. Further, the lattice portion 340 of FIG. 3 is not shown in FIG. 4 for visual clarity.

The example turbocharger 201 may include one or more bearings, including a journal bearing 424, shaped to allow the shaft 322 to extend therethrough. The bearing(s) may be further shaped to circumferentially surround at least a portion of the shaft. Lubricant may flow into the journal bearing 424 so that the shaft 322 may be lubricated as it rotates, thereby decreasing mechanical wear experienced by the shaft. In one example, the journal bearing 424 is a cartridge journal bearing which may comprise a tapered pad and/or tri-load configuration.

The turbocharger 201 may further include one or more thrust bearings. For example, a thrust bearing 425 may be arranged at an end of the shaft 322, adjacent to a compressor wheel 412. Thus, the thrust bearing 425 may be arranged between the journal bearing 424 and the compressor wheel 412 along the central axis 399. The thrust bearing 425 may be shaped to support an axial load while also providing lubrication to an interface between the shaft 322 and the compressor wheel 412. The thrust bearing 425 may be arranged outside of the journal bearing 424, adjacent to a compressor end of the bearing case (e.g., closer to the compressor case portion of each monolithic component than the turbine case portion). In some examples, the thrust bearing 425 may at least partially surround a portion of the journal bearing 424. An additional bearing 427 may be positioned at an opposing end of the shaft from the compressor wheel 412, adjacent to or near the turbine wheel 304 (e.g., positioned between the journal bearing 424 and the above-described the thrust bearing 425 that is positioned at a compressor wheel-end of the shaft 322).

The turbine 302 may further comprise a plurality of vanes 410 arranged adjacent to and surrounding the turbine wheel 304, around an entire circumference of the turbine wheel, along a nozzle ring 408. Together, the nozzle ring 408 and the plurality of vanes 410 may form a nozzle of the turbine (e.g., turbine nozzle), adapted to guide exhaust flow to the turbine wheel 304. The plurality of vanes 410 may be printed onto the nozzle ring 408 in some examples. Additionally or alternatively, the plurality of vanes 410 may be assembled from a mold. In some examples, the plurality of vanes 410 may be fixed and stationary. For example, each vane may be stationary and may not move (e.g., pivot, rotate, or translate) relative to the nozzle ring 408 and a central axis of the turbine wheel (e.g., the central axis 399). Additionally, the plurality of vanes 410, inside the turbine, may be free of electrical, mechanical, pneumatic, hydraulic, and other types of actuators. In such examples, the plurality of vanes 410 may be free of moving parts, such as a sliding wall, slotted shroud, or other devices configured to adjust the turbine housing geometry. In one example, the vanes 410 may be fixed relative to the nozzle ring 408 such that when the ring 408 rotates, the vanes 410 remain stationary. Additionally or alternatively, the vanes 410 may rotate with a rotation of the nozzle ring 408, but may not rotate independent of the nozzle ring 408.

The plurality of vanes 410 may be arranged around an entire circumference of the nozzle ring 408, between the turbine wheel 304 and the turbine inlet 323. The plurality of vanes 410 may be shaped to adjust a geometry of the turbine 302 based on one or more engine conditions, such as an engine power level. The plurality of vanes 410 may be shaped to inject air through one or more ports 411, which may create a boundary layer of air. The boundary layer of air may reduce an effective throat area of the nozzle, which may adjust an operating point of the turbocharger 201. In one example, the boundary layer of air adjusts an effective geometry of the turbine 302 to accelerate exhaust gas as the exhaust gas flows between the boundary layer and the turbine blades, making the turbine blades spin faster than the turbine blades would spin otherwise. This may be desired when a current level of exhaust gas production is insufficient (e.g., below a threshold) to meet a current boost demand, such as during a lower engine power level.

As introduced above with respect to FIG. 2A, the turbocharger case 205 may be 3D-printed as a two monolithic structures and then fastened together along one axial seam. Each monolithic component of a turbocharger case may include (without any physical boundary therebetween) a turbine region covering half of the turbine (e.g., the first turbine case portion 226 and the second turbine case portion 236 shown in FIG. 2A), a compressor region covering half of the compressor (e.g., the first compressor case portion 222 and the second compressor case portion 232 shown in FIG. 2A), a bearing region covering half of the journal bearing and the shaft (e.g., the first bearing case portion 224 and the second bearing case portion 243 shown in FIG. 2A), a compressor shroud portion comprising half the compressor shroud (e.g., the first compressor shroud portion 220 and the second compressor shroud portion 230 shown in FIG. 2A), and a turbine shroud portion comprising half the turbine shroud (e.g., the first turbine shroud portion 228 and the second turbine shroud portion 238 shown in FIG. 2A). A thermal isolation layer (barrier) may be shaped and/or configured to mitigate heat transfer from the turbine to the bearing. One location in which the thermal isolation layer may be arranged is behind the turbine wheel 304, between the turbine wheel 304 and the journal bearing 424, such as at a virtual boundary of the turbine region and the bearing region on the turbocharger case 205. The thermal isolation layer is described in more detail below with reference to FIG. 6B.

The nozzle ring 408 may be printed onto the turbocharger case 205 at the virtual boundary between the turbine region and the bearing region. The nozzle ring 408 may be attached to and/or may be integrated with turbocharger case 205 at one end (at the end proximal to the shaft 322) and free standing on an opposing end of the nozzle ring. In this way, during operation of the turbocharger 201, the free end of the nozzle ring 408 may expand to mitigate build-up of thermal stress, thereby maintaining structural integrity.

A targeted water cooling system with fluidic passages may be integrated into the turbocharger case 205 to provide cooling to areas of the case, such as the virtual boundary of the turbine region and the bearing region, that may be exposed to temperature gradients during turbocharger operation. In one example, the targeted water cooling system may include a single fluidic passage 418 shaped like a helix with an inlet/outlet 420. Coils of the helix may pass through a plurality of cutouts in the case, including the cooling passage cutouts 365a, 365b, 367a, and 367b described above with respect to FIG. 3, such that a larger surface area of the turbocharger 201 and the turbocharger case 205 is cooled by the fluid flowing through the passage. By forming a plurality of cutouts in the turbocharger case 205, the passage of the cooling system may be well integrated and distributed over the entirety of the case. The helix of the cooling system may be radially symmetric around the central axis 399 with two or more coils (passages) integrated into the turbocharger case 205. By distributing the cooling passage over the entire case, a uniform cooling of the case may be ensured, thereby decreasing thermal stress between parts of the turbocharger case 205 caused due to a temperature gradient and unequal thermal expansion during operation of the turbocharger 201. In some examples, portions of the turbocharger 201 and/or the turbocharger case 205 may be non-actively cooled, meaning cooled through thermal conductivity with contacting parts or natural air convection, and not through water cooling or other forced convection.

An example cooling core 500 is shown in FIG. 5. The exterior of the cooling core 500, as shown in FIG. 5, represents hollow passages through the turbocharger case 205. The cooling core 500 may include a single fluidic passage shaped as a helix with a first end 502, a first coil 508 and a second coil 506, and a second end 504. The first end 502 and the second end 504 of cooling core 500 may have rectangular or square cross-sections. The first coil 508 and the second coil 506 may pass through an interior of the case and at least partially envelop turbocharger components such as the turbine wheel and the bearing. For example, the first coil 508 may pass through the cooling passage cutouts 365a and 365b shown in FIG. 3, and the second coil 506 may pass through the cooling passage cutouts 367a and 367b shown in FIG. 3. Further, the first coil 508 may pass through the cooling passage cutouts 265a and 265b of the gasket 208 shown in FIG. 2C and to a corresponding cutout in the first monolithic component 207 (shown in FIG. 2A), and the second coil 506 may pass through the cooling passage cutouts 267a and 267b of the gasket 208 shown in FIG. 2C and to a corresponding cutout in the first monolithic component 207. Thus, the single fluidic passage of the cooling core 500 may be a composite passage formed of portions within the first monolithic component, the gasket, and the second monolithic component to flow coolant between the first monolithic component and the second monolithic component. When coolant flows through cooling core 500, the coolant may traverse the seam between the first monolithic component 207 and the second monolithic component 210 at multiple locations along the seam (e.g., at the cooling passage cutouts described above), but may not traverse any other seams or joints.

In this way, the cooling core 500 may include a curved or helical portion that approximately encircles at least a portion of the shaft 322 of the turbocharger 201 shown in FIGS. 3 and 4, for example. As used herein, approximately encircling may include surrounding all or most of the shaft or other component at a given point, such as encircling 90% or more of the circumference of the shaft at a given point or plane. Due to the helical nature of the cooling core 500, the encircling may be angled, such that a start point of the circle is positioned vertically above or below a stop point of the circle.

The cooling core 500 may be an example of the coolant passage 418 of FIG. 4 and may be positioned relative to the turbocharger components as shown therein. During turbocharger operation, heat from the turbine wheel may be transferred to a coolant such as water flowing through the cooling core 500, thereby actively cooling the turbine wheel. Due to the heat adsorption, the water exiting cooling core 500 may be at a higher temperature relative to the water entering the cooling core 500. In one example, the amount of water (rate of flow of water) circulated through the cooling core 500 may be adjusted via adjusting positions of one or more valves of a flow control system arranged upstream of the first end. As an example, the amount of water circulated may be increased with an increase in turbocharger speed while the amount of water circulated may be decreased with a decrease in turbocharger speed. Also, the rate of flow of water through the cooling core 500 based on a temperature gradient between the turbine and the bearing, the rate increased with an increase in the temperature gradient and the rate decreased with a decrease in the temperature gradient. The cooling core may also mitigate a temperature gradient between the two monolithic components as the cooling core flows through both monolithic components.

In some examples, fluid may enter the cooling core 500 though the first end 502 and after circulating through each of the first coil 508 and the second coil 506 may exit the cooling core 500 through the second end 504. In other examples, fluid may travel in the opposite direction, entering the cooling core 500 through the second end 504 and, after circulating through each of the second coil 506 and the first coil 508, exiting the cooling core 500 through the first end 502. Directionality of fluid through the cooling core 500 may be static or dynamically controlled (e.g., based on an operating status of the vehicle, a temperature of the turbocharger and/or other components in a coolant circuit that includes the cooling core 500, an operating schedule for the coolant circuit including the cooling core 500, and/or other vehicle parameters). For example, while turbocharger components are above a threshold temperature at which the components are to be cooled, coolant flow through the cooling core 500 may be controlled to direct the coolant from the cooling core 500 to one or more other vehicle components that benefit from heated coolant and/or to a coolant component that is configured to dissipate excess heat from the coolant (e.g., a radiator or other heat transfer device). In another example, while the turbocharger components are below a threshold temperature at which the turbocharger components are not to be cooled, coolant flow through the cooling core 500 may be controlled to direct the coolant from the cooling core 500 to one or more other vehicle components that benefit from cooled coolant and/or to a coolant component that is configured to heat up the coolant (e.g., a heater).

The first coil 508 and the second coil 506 may be co-axial. The first coil 508 may have a rectangular cross section where outer walls 514 and inner walls 516 of the cooling core 500 are broader than the narrower upper walls 518 and lower walls (opposite the upper walls 518) of the cooling core 500. The portion of the cooling core 500 connecting the first coil 508 to the second coil 506 may be twisted relative to the first coil 508 to form a helical shape. The second coil 506 may have a different shape and/or orientation than the first coil 508. For example, the second coil 506 may have a rectangular, trapezoidal, or triangular cross section with a flattened top wall, and at least one side wall (e.g., outer wall 514, which faces an outer region of cooling core 500 and/or faces away from turbocharger components being cooled by the cooling coil) that is angled such that a bottom of the side wall is further from a center of the second coil 506 than a top of the side wall. The flattened shape of the second coil 506 may allow the second coil 506 to more closely conform to the surface of the turbine.

The inner wall in the region of the first coil 508 and/or the second coil 506 may include a plurality of ribs 512 (e.g., indentations or grooves that project into an interior of the coolant passage formed by the first coil 508). The ribs 512 formed on each coil may extend along at least a portion of the inner wall 516 in the region of the respective coil(s), the ribs 512 being mutually parallel. By including the ribs 512, the surface area of the walls of the coils 508, 506 in contact with turbocharger components may be increased. Inclusion of the ribs may increase the interface between cooling core 500 and the bearings with ribs 512 accommodating the bearings and providing effective cooling to the bearings. In this way, the ribs may facilitate heat transfer, and as such may be configured to optimize heat transfer. For example, the space between adjacent ribs and the height of the ribs may be selected to provide a desired amount of heat transfer. In one non-limiting example, adjacent ribs may be spaced apart by a distance (such as 10 mm or 20 mm) that is equal to a height (e.g., 10 mm or 20 mm) of each rib, and each rib may have a width that is less than half the height of each rib (e.g., 3 mm or 7 mm). While ribs are described herein, it is to be understand that other heat transferring structures may be used in addition or alternative to the ribs, such as fins, vanes, or other protuberances.

Returning to FIG. 4, in examples where the turbocharger includes a fluidic variable turbine herein the vanes 410 on the nozzle ring 408 are stationary and direct various amounts of air into the turbine nozzle to adjust a throat area of the nozzle through fluidic blocking, a conduit (passage) 416 may be formed in the first monolithic component 207 (shown in FIG. 2A) and the second monolithic component 210 via which air may flow to the vanes. For example, a first portion of the conduit 416 may be formed in the first monolithic component 207, and a second portion of the conduit 416 may be formed in the second monolithic component 210. The conduit 416 may be a hollow tube with a circular cross-section positioned within the case. The conduit 416 may be radially symmetric around the central axis 399 and may be positioned adjacent to the vanes on the nozzle ring. The conduit 416 may pass through one or more of a plurality of cutouts in the gasket 208, such as conduit cutout 269*a* and conduit cutout 269*b* shown in FIG. 2C, so that the first portion of the conduit and the second portion of the conduit are fluidically coupled. As such, the conduit 416 may be a single, composite passage that extends between the first monolithic component 207 and the second monolithic component 210. The conduit 416 may include an air inlet and an air outlet via which air may be routed to the vanes. Air flow from an air flow control system to the one or more vanes via the conduit may be adjusted based on engine power level. As an example, the air flow may be decreased with an increase in engine power level while the air flow may be increased with a decrease in engine power level. As disclosed herein, the air flow from the air flow control system may include atmospheric air, other fluidic sources (e.g., other gases), and/or a mixture of fluidic sources.

The turbocharger case 205 may further include passageways 431, which may be configured to direct oil or other lubricants to the bearing 424 and/or the shaft 322. The passageways 431 may be formed similarly to the coolant passages 418 as open spaces within the turbocharger case adjacent to solid material of the case. The passageways may have fluidic access to the shaft and/or bearing in order to deliver the lubricant thereto. In some embodiments, the passageways 431 are included in one of the monolithic components, such as the second monolithic component 210 shown in FIG. 4. In other embodiments, each monolithic component includes its own passageways 431 that are fluidically coupled through the shaft and/or bearing, but not directly coupled as a single composite passage. In still other embodiments, the passageways 431 may form a single composite passage, with a first portion of the passageways 431 in the first monolithic component 207 aligning with a second portion of the passageways 431 in the second monolithic component. At an opposite end of the passageways 431 from the fluid access points, the passageways 431 may be coupled to an oil or other lubricant source, either directly or via additional passageways outside of the turbocharger case 205.

At least certain portions 432*a-c* of the turbocharger case may be constructed with a lattice structure to provide increased strength and structural integrity to the two monolithic components of the turbocharger case. Since the turbocharger case is an axially split structure enclosing the entire turbine, compressor, and bearing, the incorporation of portions with a lattice pattern may reduce the overall weight of the case compared to completely solid configurations while improving the strength compared to configurations that include open cavities. The lattice structured portions may be distributed symmetrically around the central axis 399 in selected regions of the two monolithic sections of the turbocharger case 205 while the remaining part of the case may be a solid structure. As such, the lattice structure portions may also be symmetric across the longitudinal axis of the seam between the first monolithic component and the second monolithic component. In some examples, the size, shape, position, etc., of the lattice may be selected based on allowed stress to increase structural strength while reducing a weight of the turbocharger case 205. In an embodiment, the lattice structure and/or lattice portion is defined at the macro, non-atomic level to include an array or arrays of interconnected material with dispersed or distributed voids or spaces, e.g., regions lacking material. For example, the largest cross-dimensions of the voids or spaces, which may be the same or different from one another, may be at least 0.5 mm, or at least 1.0 mm (e.g., from 0.5 mm to 1.0 mm, or from 0.5 mm to 1.0 cm, or from 1.0 mm to 1.0 cm), such that at least some adjacent sections of material are spaced apart from one another by such an amount, with either no material therebetween or a different material therebetween.

In one example, the first lattice portions 432a may be positioned adjacent or near to a compressor wheel represented at 412. The first lattice portions 432a may be cross-sections of a continuous or semi-continuous arc around the central axis. The dimension (shape, size, and/or diameter) of the continuous arc may vary along the length of the arc to accommodate the turbocharger 201 components (such as the upper portion of the shaft 322) placed in the region. The first lattice portions 432a may be polygonal with one side elongated relative to the other sides. The first lattice portions 432a may extend substantially between an outer wall of the turbocharger case and an upper region of the shaft.

The second lattice portions 432b may be positioned around the shaft and/or adjacent to the bearing 424. The second lattice portions 432b may be cross-sections of a continuous or semi-continuous arc around the shaft 322. The second lattice portions may be pentagonal structures with dimensions varying along the length/circumference of the arc according to the adjoining turbocharger components (such as the shaft and the bearing). The second lattice portions 432b may extend between the shaft 322 and the passageway 431 (e.g., in a triangular region formed between the shaft and two trunks of the passageway: a trunk leading to an upper bearing near the compressor 412 and a trunk leading to the bearing) in at least one region of the turbocharger case.

The third lattice portions 432c may be positioned adjacent to or near the nozzle ring 408 and/or the turbine wheel 304. Accordingly, as shown, the first, second, and third lattice portions are arranged at different radial locations of the case. The first lattice portions 432a may be closest to the compressor (e.g., closer to the compressor than the second and third lattice portions), the third lattice portions 432c may be closest to the turbine (e.g., closer to the turbine than the first and second lattice portions), and the second lattice portions 432b may be positioned between the first and second lattice portions along the central axis 399. The third lattice portions 432c may be cross-sections of a continuous or semi-continuous arc around the central axis (e.g., around the shaft and around the coolant passages). The dimension (shape, size, diameter) of the continuous arc may vary along the length of the arc to accommodate the turbocharger components (such as the fluidic passages 418 of the cooling core 500) placed in the region. The third lattice portions 432c may extend substantially between the outer wall of the turbocharger case and the shaft (e.g., between the outer wall of the case and a trunk of the passageway leading to a lower bearing near the turbine/nozzle ring). At least a portion of the third lattice portions 432c may be shaped in a complementary manner to a portion of the conduit 416.

The third lattice portions 432c may be at least partially aligned with or intersect a central axis of the first lattice portions 432a (e.g., in a direction along the axis of rotation of the shaft, which may be coaxial with central axis 399), while the second lattice portions 432b may be positioned closer to the axis of rotation of the shaft than the first and second lattice portions. The first and second lattice portions may be separated from the shaft and/or an associated bearing (e.g., bearing 425 or bearing 424, respectively) via solid material of the turbocharger case 205, while the third lattice portion may be separated from the shaft and/or an associated bearing (e.g., bearing 427) via solid material of the turbocharger case 205 and other structures of the turbocharger case 205 (e.g., oil passageway 431 and coolant passages 418). As used herein, description of a first element or region as being "adjacent to" another element or region may be understood to include examples where the two elements/regions are in direct, face-sharing contact as well as examples where the two elements/regions are separated by solid material of the turbocharger case 205.

FIG. 6A shows a lattice structure 600 which may constitute at least certain portions of the turbocharger case 205, such as portions 432a-c of FIG. 4. The lattice structure 600 forms a three-dimensional (3D) grid or matrix of parallel and intersecting lines of material. The material of the macro lattice may be uniform in size, shape, spacing, and/or distribution throughout the entire structure in some examples. In other examples, the material of the macro lattice may be non-uniform in size, shape, spacing, and/or distribution in at least a portion of the structure or throughout the entire structure. As used herein, the term "grid" or "matrix" may be understood to include a structure of solid lines of material that are uniform or non-uniform in size, uniform or non-uniform in shape, uniform or non-uniform in spacing, and/or uniform or non-uniform in distribution throughout the structure.

A plurality of horizontal lines 632 may intersect with vertical lines 634 at nodes 636 to form the grid. In some examples, lines of material forming the grid of the lattice structure may be equally spaced, thereby providing a uniform macro structure of pores. In other examples, the lines of material forming the grid of the lattice structure may be non-equally spaced, thereby providing a non-uniform macro structure of pores. The lines may be 3D printed with a material, such as nickel or stainless steel alloys, carbon steel based alloys, or other material, which may also be used for manufacturing the turbocharger case 205. The pores may contain air, fluids, or polymers to dampen vibration or add rigidity while minimizing material usage, cost, and so forth. Due to the 3D structure of the lattice, the structural integrity and strength may be higher than a solid structure even though the overall weight may be lower. Also, the interconnected grid allows effective heat transfer through the lattice structure. In this way, by fabricating portion of the case with a lattice structure, the overall weight of the case may be reduced while improving strength and heat transfer.

Turning to FIG. 6B, a second, partial cross-sectional view 620 of the turbocharger case is shown, where the cross-section depicted in FIG. 6B is at a different depth of the turbocharger case 205 than the cross-sections depicted in FIGS. 3 and 4. Further, the cross-sectional view 620 is of the first monolithic component 207, although it may be understood that the second monolithic component 210 may have similar features. A thermal isolation layer 614 may be positioned between the turbine wheel 304 and the bearing 424, such as at the virtual boundary of the turbine region and the bearing region on the turbocharger case 205. The thermal isolation layer may reduce heat flow between the turbine wheel 304 (which it at a higher temperature during turbocharger operation) and the bearing. Due to the reduced heat flow, a thermal gradient may not form at the boundary of the turbine region and the bearing region on the turbocharger case 205, thereby reducing thermal stress and mechanical wear.

As shown in the inset 630, as seen in greater detail in FIG. 6C, the thermal isolation layer may include a plurality of holes 616. Adjacent holes 616 may be evenly spaced from one another along a length of the thermal isolation layer 614 and/or evenly radially spaced away from the shaft 322 and/or the central axis of the turbocharger case 205. The holes 616 may be positioned adjacent a region of lattice material in the case. The holes 616 may form concentric rings of voids in a material of the turbocharge case 205 around the shaft. For example, a first semi-circular portion of the holes 616 in the first monolithic component 207 may align with a second semi-circular portion of the holes 616 in the second monolithic component 210 (not shown in FIG. 6B) to form composite concentric rings that extend between the first monolithic component 207 and the second monolithic component 210. The holes 616 may contain air in some examples. In other examples, the holes 616 may be fluidly coupled to a coolant source and configured to flow a coolant therethrough, such as water. In such examples, the holes 616 may form a spiral pattern rather than separate concentric rings.

A plurality of cooling passage cutouts 665a, 665b, 667a, and 667b may be formed in the first monolithic component 207 of the turbocharger case 205 to allow the passages of the water cooling system to pass. For example, the cooling passage 665a aligns with the cooling passage 365a of the second monolithic component 210 shown in FIG. 3, the cooling passage 665b aligns with the cooling passage 365b of the second monolithic component 210 shown in FIG. 3, etc. The water cooling system provides cooling to the turbine wheel 304 and the bearing 424 to further reduce the temperature gradient and the thermal stress on parts of the turbocharger case 205, as elaborated above with respect to FIG. 5. The plurality of cooling passage cutouts 665a, 665b, 667a, and 667b may be of different shapes and sizes to accommodate the geometry of the cooling system passage passing therethrough. Further, by forming the turbocharger case 205 from two monolithic, axial portions, thermal strain may be further reduced by reducing the number of hot joints relative to a traditional turbocharger case design. Further, this the axially split turbocharger case 205 may increase engineering tolerances relative to a traditional turbocharger case design, as reducing the number of components decreases the overall engineering tolerances, for example.

Accordingly, as described in more detail below, the turbocharger case 205 may be manufactured using an additive manufacturing process such as 3D printing. By utilizing additive manufacturing, the complex case structure including portions of solid material, portions of intermittent solid material (e.g., forming a lattice structure), and open regions (e.g., forming openings for oil passageways and coolant passages, as well as openings for turbocharger components) may be manufactured in a fast and low-cost manner, without requiring multiple individual structures that are welded or otherwise fastened together. Further, some parameters of the case structure, such as material thickness and/or spacing of material in the lattice regions, as well as the overall dimensions of the case, may be selected based on application-specific parameters. The use of additive manufacturing, as described herein, may accommodate such application-specific adjustments by adjusting the model of the case used as instructions for the additive manufacturing and without requiring completely different manufacturing equipment.

An example method 700 for 3D printing a turbocharger case, such as the turbocharger case 205 introduced in FIG. 2A, is illustrated in FIG. 7. Method 700 may be carried out at least in part by an additive manufacturing device, which may be operatively/communicatively coupled to a printer-interfacing computing device.

At 702, the method includes obtaining or generating a 3D model of the axially split turbocharger case (e.g., the axially split combined turbine, compressor, and bearing case). The model of the case may be a computer aided design (CAD) file, additive manufacturing file (AMF), or other 3D modeling file. The 3D model of the case may be generated on a printer-interfacing computing device. In some examples, the 3D model may be generated entirely from operator instructions via the CAD or other program. In other embodiments, the 3D model may be generated at least in part from information received from a 3D scanner (e.g., a laser scanner) that may image a physical model of the case. The 3D model may define the dimensions of the case, exterior and interior structures of the case, and material properties of the case, thereby fully representing, in a digital format, the final form of the case that will be produced. Further, each monolithic section of the axially split case may be printed separately, with a separate 3D model generated for each piece or a single 3D model that is divided into the two monolithic portions. As appreciated by FIGS. 3-6C (described in more detail above), for example, the case includes voids (e.g., empty space) and thus the 3D model of the case may include support structures, fill material, or other features that allow for printing over the voids. The 3D model may include the base portion of the case and/or the interior structures in order to produce a case that includes the base portion and/or interior structures seamlessly integrated with the meshwork of the case. In other embodiments, the base portion and/or interior structures may be manufactured separately from the meshwork of the case, and thus may not be included in the 3D model.

At 704, the method includes generating a plurality of 2D slices of the 3D model of the case. The slices may be generated on the printer-interfacing computing device, and then the plurality of slices are sent to the printing device as an STL file. Alternatively, the 3D model of the case may be sent to the printing device, and the printing device may slice the 3D model into the plurality of slices to generate an STL file. In doing so, the 3D model may be sliced into hundreds or thousands of horizontal layers of a suitable thickness, such as a thickness in a range from 0.1 mm to 3 mm. The total number of layers or slices may be based on a thickness of the case, a material used for the printing, and/or user selection.

At 706, the method includes printing, with the printing device, the first slice on a build plate or other suitable base material. When the printing device prints from the STL file, the printing device creates or prints the case layer-by-layer on the build plate. Accordingly, at 708, the method includes sequentially printing each additional slice of the 3D model. For example, the printing device may read a plurality of slices (or 2D image) from the 3D model and proceed to create the 3D case by laying down (or printing) successive layers of material on an upper, planar surface of the build plate until the entire case is created. Each of these layers can be seen as a thinly sliced horizontal cross section of the eventually completed or printed 3D case.

The printing device may be a suitable device configured to print metal and/or other high magnetic permeability materials, such as aluminum or stainless steel. The printing device may utilize selective laser melting (SLM) technology, direct metal laser sintering (DMLS) technology, or other suitable metal printing technology. In some examples, the printing device may be configured to print multiple materials (e.g., the material for the case and fill material for voids of the case, and/or material for different regions of the case) and thus may include more than one print head.

During printing, the print head(s) is moved, in both horizontal and vertical directions, to complete or print each layer of the 3D model by a controlled mechanism that is operated by control software running on the printing device, e.g., a computer-aided manufacturing (CAM) software package adapted for use with the printing device. The build plate is typically stationary with its upper planar surface parallel to a horizontal plane, although in some examples the build plate may be moved up and down vertically (e.g., in the z-direction). The printed material solidifies to form a layer (and to seal together layers of the 3D case), and the print head or build plate is then moved vertically prior to starting the printing of the next layer. This process is repeated until all layers of the 3D case have been printed.

At 710, the method includes drying and/or curing the case. For example, the printing process may include one or more drying and/or curing stages, which may include drying and/or curing each layer after the respective layer is printed and/or drying and/or curing the printed case after all layers are printed. The printed material may be cured by exposure to heat or UV radiation and allowed to harden (e.g., fully or partially). After drying/curing, any fill material used may be removed. For example, if a fill material is printed in the voids, the case may be placed into water, acid, or other solvent to dissolve the fill material. In another example, if support structures are printed in the voids (e.g., scaffolding-like structures or perforated structures), the support structures may be removed manually and/or with a tool. Method 700 may then return.

The method 700 provides an example for manufacturing the axially split turbine, compressor, and bearing case of the present disclosure using additive manufacturing technology, such as 3D printing. In an example, the axially split turbine, compressor, and bearing case described herein may be manufactured according to a computer readable medium including computer readable instructions which, when executed on a 3D printer or associated computing device, cause the printer to print the monolithic turbine and bearing case. It is to be understood that the example additive manufacturing process described in FIG. 7 is just one example of manufacturing the axially split case of the present disclosure, and other manufacturing processes may be used in addition to or as an alternative to the method 700. For example, all or a portion of the case of the present disclosure may be manufactured using a mold. The mold may be generated by first 3D printing a model of the case in a suitable material that may be solid at room temperature but changes to liquid at a relatively low temperature that is greater than room temperature, such as wax. A plaster mold may be formed over the wax model, and after the plaster dries, the wax may be melted and drained from the mold. The mold may then be filled with molten metal. Once the metal cools, the plaster may be removed to generate the case. As another example, the case may be manufactured using subtractive manufacturing technology. For example, as described briefly above, one or more lasers or other etching or subtractive mechanisms may be controlled by a computing device to selectively melt or otherwise remove material from a base structure in order to form a case having the overall dimensions and interior features of the turbine, compressor, and bearing case described herein (e.g., based on a 3D model of the case, generated as described above). As still another example, the case may be formed by stack lamination, in which different layers of the case are formed independently by a process such as photolithography, and the layers are stacked and laminated to fuse the layers together. It is to be understood that any combination of 3D manufacturing techniques may be combined to produce the axially split turbine, compressor, and bearing case of the present disclosure.

As discussed above, the 3D printing process may utilize one or more materials for building the structure of the case and/or for building optional support structures within the case. For example, the material used to build the structure of the case may have different (e.g., higher) thermal properties (e.g., melting point) and/or other parameters (e.g., strength, rigidity, etc.) than the material used to build support structures in order to allow the support structures to be removed from the case. Furthermore, different regions of the case may be manufactured using different materials. For example, some regions of the case may be manufactured using material with higher elasticity/flexibility than other regions, higher porosity than other regions, higher density/strength than other regions, etc. In other examples, the entire case may be printed using the same material. As described above, examples of materials used for manufacturing the case include metal and/or other high magnetic permeability materials, such as aluminum, nickel alloys, or stainless steel. In other examples, materials used for manufacturing the case may include carbon steel based alloys.

In this way, the components of FIGS. 1-6C provide for a system comprising: a turbocharger including a turbine, a compressor, a shaft coupling the turbine and compressor, and at least one bearing adjacent to the shaft, an axially split turbocharger case enclosing each of the turbine, the shaft, and the bearing; a targeted water cooling system integrated into the case to cool an interface of the turbine, the bearing, and the case; and a thermal isolation barrier positioned at the interface.

An example provides for an apparatus for an engine, including a first monolithic component and a second monolithic component that, when coupled together, form a turbocharger case configured to house each of a turbine, a compressor, and a bearing, the first and second monolithic components, when coupled together, also forming a compressor shroud and a turbine shroud. In a first example of the apparatus, the first monolithic component does not have any joints or seams, and wherein the second monolithic component does not have any joints or seams. In a second example of the apparatus, which optionally includes the first example, the first monolithic component includes a first compressor case portion, a first bearing case portion, a first turbine case portion, a first compressor shroud portion, a first turbine shroud portion, a first compressor volute portion, and a first turbine volute portion seamlessly integrated to form the first monolithic component, and wherein the second monolithic component includes a second compressor case portion, a second bearing case portion, a second turbine case portion, a second compressor shroud portion, a second turbine shroud portion, a second compressor volute portion, and a second turbine volute portion seamlessly integrated to form the second monolithic component. In a third example of the apparatus, which optionally includes one or both of the first and second examples, the first monolithic component extends continuously, without any joints or seams, from a first end of the first monolithic component defined by the first compressor shroud portion to a second end of the first monolithic component defined by the first turbine shroud portion, and wherein the second monolithic component extends continuously, without any joints or seams, from a first end of the second monolithic component defined by the second compressor shroud portion to a second end of the second monolithic component defined by the second turbine shroud portion. In a fourth example of the apparatus, which optionally includes one or more of each of the first through third examples, the first monolithic component includes a first flange and the second monolithic component comprises a second flange, the first flange and the second flange configured to be mated when the first monolithic component and second monolithic component are coupled together. In a fifth example of the apparatus, which optionally includes one or more of each of the first through fourth examples, the apparatus includes a gasket, the gasket configured to be at least partially positioned within a groove defined by at least one of the first flange and the second flange and configured to be in face-sharing contact with each of the first monolithic component and the second monolithic component when the first monolithic component and the second monolithic component are coupled together. In a sixth example of the apparatus, which optionally includes one or more of each of the first through fifth examples, the turbocharger case is configured to house a shaft that couples the turbine to the compressor, and the turbocharger case is configured for the bearing, when disposed in the turbocharger case, to be positioned adjacent to the shaft. In a seventh example of the apparatus, which optionally includes one or more of each of the first through sixth examples, the first monolithic component and second monolithic component each have a respective inner surface that includes cutouts for a cooling core configured to flow a cooling fluid to cool an interface between the turbine and the bearing, the cooling fluid traversing a seam between the first monolithic component and the second monolithic component at the cutouts. In an eighth example of the apparatus, which optionally includes one or more of each of the first through seventh examples, the cooling core is defined at least in part by a hollow passage and includes an inlet tube, an outlet tube, and a curved or helical portion that approximately encircles at least a portion of the shaft and extends between the first monolithic component and the second monolithic component when the first monolithic component and the second monolithic component are coupled together.

Another example provides for a system comprising: a turbocharger including a turbine, a compressor, a shaft coupling the turbine and compressor, and at least one bearing adjacent to the shaft; an axially split turbocharger case housing each of the turbine, the compressor, the shaft, and the at least one bearing, the axially split turbocharger case including two monolithic components coupled along a seam that has a longitudinal axis parallel to a longitudinal axis of the shaft, each monolithic component extending from a respective first end to a respective second end without any joints or seams; and an engine having a crankshaft, the crankshaft having a longitudinal axis that is perpendicular to the longitudinal axis of the seam. In a first example of the system, the axially split turbocharger case includes a gasket coupled between the two monolithic components at the seam. In a second example of the system, which optionally includes the first example, each of the two monolithic components includes one half of a turbine case portion, a bearing case portion, and a compressor case portion. In a third example of the system, which optionally includes one or both of the first and second examples, the axially split turbocharger case further includes a compressor shroud and a turbine shroud, one half of the compressor shroud and one half of the turbine shroud included in each of the two monolithic components. In a fourth example of the system, which optionally includes one or more or each of the first through third examples, the axially split turbocharger case includes one or more regions formed of a lattice structure, the one or more regions symmetric across the longitudinal axis of the seam. In a fifth example of the system, which optionally includes one or more of the first through fourth examples, the lattice structure includes a three-dimensional grid of parallel and intersecting lines of material forming open pores.

A further example provides for a turbocharger case housing a turbine, a compressor, and a bearing of a turbocharger of an engine system, the turbocharger case comprising: two monolithic components coupled along respective interior planar surfaces to form a single seam that extends axially in a direction parallel to a rotational axis of the turbine, each monolithic component including one or more lattice structured portions distributed around a central axis of the turbocharger; and one or more cutouts on the respective interior planar surface of each monolithic component, the one or more cutouts having a complementary shape to a cooling core disposed in the turbocharger case. In a first example of the system, the turbocharger case further comprising an oil passageway between an oil supply of the engine system and the bearing of the turbocharger. In a second example of the turbocharger case, which optionally includes the first example, the one or more lattice structured portions include, for each monolithic component, a first lattice structured portion disposed adjacent to a compressor wheel of the compressor, a second lattice structured portion disposed between the bearing and a portion of the oil passageway, and/or a third lattice structure portion disposed adjacent to a nozzle ring. In a third example of the system, which optionally includes one or both of the first and second examples, the turbocharger case includes a sealing gasket positioned between respective interior planar surfaces at the single seam. In a fourth example of the system, which optionally includes one or more of the first through the third examples, the cooling core traverses the seam between the two monolithic components at the one or more cutouts to flow coolant between the two monolithic components.

In embodiments, a turbocharger apparatus includes a first monolithic component and a second monolithic component that, when coupled together, form a complete turbocharger case configured to house each of a turbine, a compressor, and a bearing, i.e., each of the monolithic components is half of the turbocharger case; the first and second monolithic components, when coupled together, also form a compressor shroud and a turbine shroud. In other embodiments, a turbocharger apparatus includes a first monolithic component, a second monolithic component, and a third monolithic component that, when coupled together, form a complete turbocharger case configured to house each of a turbine, a compressor, and a bearing, i.e., each of the monolithic components is one-third of the turbocharger case. In other embodiments, a turbocharger apparatus includes a first monolithic component, a second monolithic component, a third monolithic component, and a fourth monolithic component that, when coupled together, form a complete turbocharger case configured to house each of a turbine, a compressor, and a bearing, i.e., each of the monolithic components is one-fourth of the turbocharger case.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for an engine, comprising:
a first monolithic component comprising a first flange and a second monolithic component comprising a second flange that, when coupled together, form a turbocharger case configured to house each of a turbine, a compressor, and a bearing, the first and second monolithic components, when coupled together, also forming a compressor shroud and a turbine shroud, the first monolithic component and second monolithic component each have a respective inner surface that includes cutouts for a cooling core that is adjacent to a lattice structure, the cooling core configured to flow a cooling fluid to cool an interface between the turbine and the bearing, the cooling fluid traversing a seam between the first flange and the second flange at the cutouts, wherein the cooling core includes a single passage shaped as a helix.

2. The apparatus of claim 1, wherein the first monolithic component does not have any joints or seams, and wherein the second monolithic component does not have any joints or seams.

3. The apparatus of claim 1, wherein the first monolithic component includes a first compressor case portion, a first bearing case portion, a first turbine case portion, a first compressor shroud portion, a first turbine shroud portion, a first compressor volute portion, and a first turbine volute portion seamlessly integrated to form the first monolithic component, and wherein the second monolithic component includes a second compressor case portion, a second bearing case portion, a second turbine case portion, a second compressor shroud portion, a second turbine shroud portion, a second compressor volute portion, and a second turbine volute portion seamlessly integrated to form the second monolithic component.

4. The apparatus of claim 3, wherein the first monolithic component extends continuously, without any joints or seams, from a first end of the first monolithic component defined by the first compressor shroud portion to a second end of the first monolithic component defined by the first turbine shroud portion, and wherein the second monolithic component extends continuously, without any joints or seams, from a first end of the second monolithic component defined by the second compressor shroud portion to a second end of the second monolithic component defined by the second turbine shroud portion.

5. The apparatus of claim 1, wherein the first flange and the second flange are configured to be mated when the first monolithic component and second monolithic component are coupled together.

6. The apparatus of claim 5, further comprising a gasket, the gasket configured to be at least partially positioned within a groove defined by at least one of the first flange and the second flange and configured to be in a face-sharing contact with each of the first monolithic component and the second monolithic component when the first monolithic component and the second monolithic component are coupled together.

7. The apparatus of claim 1, wherein the turbocharger case is configured to house a shaft that couples the turbine to the compressor, and the turbocharger case is configured for the bearing, when disposed in the turbocharger case, to be positioned adjacent to the shaft.

8. The apparatus of claim 7, wherein the cooling core is defined at least in part by a hollow passage and includes an inlet tube, an outlet tube, and two coils that approximately encircles at least a portion of the shaft and extends between the first monolithic component and the second monolithic component when the first monolithic component and the second monolithic component are coupled together.

9. A system, comprising:
a turbocharger including a turbine, a compressor, a shaft coupling the turbine and compressor, and at least one bearing adjacent to the shaft;
an axially split turbocharger case housing each of the turbine, the compressor, the shaft, and the at least one bearing, the axially split turbocharger case including two monolithic components coupled along a seam that has a longitudinal axis parallel to a longitudinal axis of the shaft, each monolithic component extending from a respective first end to a respective second end without any joints or seams, a first monolithic component and a second monolithic component each have a respective inner surface that includes cutouts for a cooling core comprising a helix shape with two coils configured to flow a cooling fluid to cool an interface between the turbine and the bearing, the cooling fluid traversing a seam between the first monolithic component and the second monolithic component at the cutouts, wherein the cooling core is adjacent to a lattice structure; and
an engine having a crankshaft, the crankshaft having a longitudinal axis that is perpendicular to the longitudinal axis of the seam.

10. The system of claim 9, wherein the axially split turbocharger case includes a gasket coupled between the two monolithic components at the seam.

11. The system of claim 9, wherein each of the two monolithic components includes one half of a turbine case portion, a bearing case portion, and a compressor case portion.

12. The system of claim 11, wherein the axially split turbocharger case further includes a compressor shroud and a turbine shroud, one half of the compressor shroud and one half of the turbine shroud included in each of the two monolithic components.

13. The system of claim 9, wherein the axially split turbocharger case includes one or more regions formed of the lattice structure, the one or more regions symmetric across the longitudinal axis of the seam.

14. The system of claim 13, wherein the lattice structure includes a three-dimensional grid of parallel and intersecting lines of material forming open pores.

15. A turbocharger case housing a turbine, a compressor, and a bearing of a turbocharger of an engine system, the turbocharger case comprising:
two monolithic components coupled along respective interior planar surfaces to form a single seam that extends axially in a direction parallel to a rotational axis of the turbine, each monolithic component including one or more lattice structured portions distributed around a central axis of the turbocharger;

one or more cutouts on the respective interior planar surface of each monolithic component, the one or more cutouts having a complementary shape to a cooling core disposed in the turbocharger case comprising a helix shape, including a first coil and a second coil, the cooling core configured to cool an interface between the turbine and the bearing; and a sealing gasket positioned between the respective interior planar surfaces at the single seam, wherein the cooling core traverses the seam between the two monolithic components at the one or more cutouts to flow a coolant between the two monolithic components.

16. The turbocharger case of claim 15, further comprising an oil passageway between an oil supply of the engine system and the bearing of the turbocharger.

17. The turbocharger case of claim 16, wherein the one or more lattice structured portions include, for each monolithic component, a first lattice structured portion disposed adjacent to a compressor wheel of the compressor, a second lattice structured portion disposed between the bearing and a portion of the oil passageway, and/or a third lattice structure portion disposed adjacent to a nozzle ring.

* * * * *